(12) United States Patent
Wunder et al.

(10) Patent No.: US 10,843,243 B2
(45) Date of Patent: Nov. 24, 2020

(54) METHOD OF REMEDIATION OF ORGANIC TOXINS USING SUPPORTED LIPID BILAYER NANOPARTICLES

(71) Applicant: Temple University-Of The Commonwealth System of Higher Education, Philadelphia, PA (US)

(72) Inventors: Stephanie L. Wunder, Chaddsford, PA (US); Bojeong Kim, Jenkintown, PA (US)

(73) Assignee: TEMPLE UNIVERSITY-OF THE COMMONWEALTH SYSTEM OF HIGHER EDUCATION, Philadelphia, PA (US)

( * ) Notice: Subject to any disclaimer, the term of this patent is extended or adjusted under 35 U.S.C. 154(b) by 335 days.

(21) Appl. No.: 15/123,711

(22) PCT Filed: Mar. 6, 2015

(86) PCT No.: PCT/US2015/019223
§ 371 (c)(1),
(2) Date: Sep. 6, 2016

(87) PCT Pub. No.: WO2015/134892
PCT Pub. Date: Sep. 11, 2015

(65) Prior Publication Data
US 2017/0014878 A1   Jan. 19, 2017

Related U.S. Application Data

(60) Provisional application No. 61/949,645, filed on Mar. 7, 2014.

(51) Int. Cl.
*B09C 1/10* (2006.01)
*C02F 1/28* (2006.01)
(Continued)

(52) U.S. Cl.
CPC ............. *B09C 1/10* (2013.01); *B01J 20/103* (2013.01); *B01J 20/22* (2013.01);
(Continued)

(58) Field of Classification Search
CPC .. B09C 1/00; B09C 1/002; B09C 1/02; B09C 1/08; B09C 1/10; B09C 2101/00;
(Continued)

(56) References Cited

U.S. PATENT DOCUMENTS 5,069,795 A * 12/1991 Romey ............. B01D 17/0202
210/652
2006/0040388 A1 * 2/2006 Bromberg ............. B01D 53/14
435/375
(Continued)

FOREIGN PATENT DOCUMENTS

WO   2011138896A1 A1   10/2011
WO   2012167010 A2    12/2012

OTHER PUBLICATIONS

Zhang, S. et al. "Biocompatible phosphatidylcholine bilayer coated on magnetic nanoparticles and their application in the extraction of several polycyclic aromatic hydrocarbons from environmental water and milk samples." Journal of Chromatography A. Mar. 23, 2012. vol. 1238. 38-45.
(Continued)

Primary Examiner — Matthew O Savage
(74) Attorney, Agent, or Firm — Riverside Law LLP

(57) ABSTRACT

The present invention relates to methods and compositions for water treatment and environmental remediation using nanoparticle supported lipid bilayers (NP-SLBs). In one embodiment, the NP-SLBs are single or multilayer lipid bilayers of 1,2-dimyristoyl-sn-glycero-3-phosphocholine (DMPC) supported by silica.

11 Claims, 11 Drawing Sheets

(51) Int. Cl.
*C02F 3/00* (2006.01)
*B01J 20/10* (2006.01)
*B01J 20/22* (2006.01)
*B01J 20/28* (2006.01)
*C02F 3/34* (2006.01)
*C02F 101/32* (2006.01)
*C02F 103/06* (2006.01)

(52) U.S. Cl.
CPC ......... *B01J 20/28016* (2013.01); *C02F 1/281* (2013.01); *C02F 1/285* (2013.01); *C02F 1/288* (2013.01); *C02F 3/00* (2013.01); *C02F 3/348* (2013.01); *B09C 2101/00* (2013.01); *C02F 2003/001* (2013.01); *C02F 2101/327* (2013.01); *C02F 2103/06* (2013.01); *C02F 2305/08* (2013.01)

(58) Field of Classification Search
CPC .... B01J 20/22; B01J 20/103; B01J 20/28016; C02F 1/281; C02F 1/285; C02F 1/286; C02F 1/288; C02F 3/00; C02F 2003/001; C02F 3/348; C02F 2101/327; C02F 2103/06; C02F 2103/365; C02F 2305/08
See application file for complete search history.

(56) References Cited

U.S. PATENT DOCUMENTS

| | | | |
|---|---|---|---|
| 2006/0175266 A1* | 8/2006 | Rima | ............ C02F 1/725 210/764 |
| 2011/0162837 A1* | 7/2011 | O'Malley | ............ B01J 20/041 166/267 |
| 2011/0268791 A1 | 11/2011 | Liu et al. | |
| 2013/0248461 A1 | 9/2013 | Pisanova et al. | |

OTHER PUBLICATIONS

Savarala, S. et al. "Formation and colloidal stability of DMPC supported lipid bilayers on SiO2 nanobeads." Langmuir. Jun. 8, 2012. vol. 26. 12081-12088.

Wang H. et al. "Nanoparticle-supported lipid bilayers as an in situ remediation strategy for hydrophobic organic contaminants in soils." Environmental Science and Technology. Dec. 2, 2014. vol. 49. 529-536.

* cited by examiner

METHOD OF REMEDIATION OF ORGANIC TOXINS USING SUPPORTED LIPID BILAYER NANOPARTICLES

CROSS-REFERENCE TO RELATED APPLICATIONS

This application is the U.S. national phase application filed under 35 U.S.C. § 371 claiming benefit to International Patent Application No. PCT/US15/19223, filed Mar. 6, 2015, which is entitled to priority under 35 U.S.C. § 119(e) to U.S. Provisional Patent Application No. 61/949,645, filed Mar. 7, 2014, each of which application is hereby incorporated herein by reference in its entirety.

BACKGROUND OF THE INVENTION

The poor water solubility of hydrophobic contaminants such as polychlorinated biphenyls (PCBs) and polyaromatic hydrocarbons (PAHs) make them resistant to bacterial degradation. These contaminants are preferentially adsorbed by natural organic matter or humic substances, and can accumulate and be sequestered for long periods of time in the fatty tissue of fish and mammals. Therefore, techniques to remove such compounds from the environment are desired.

PAHs are widespread and represent serious risks for ecosystems and human health due to their carcinogenic and mutagenic effects. PAHs are mainly produced by the incomplete combustion of biogenic organic matter and fossil fuels, but can also be produced from other activities such as coal gasification, petroleum cracking, and crude oil refinement. PAHs have low water solubility and can become concentrated in sediments and soils in very large amounts (Bradley et al., 1994, J. Soil Contam., 3(4), 1-13; Mauro et al., 2006, Land Contam. Reclam., 513-521; Teaf, 2008, Int. J. Soil, Sed. Water, (2), 1-15; Wang et al., 2004, Soil Sed. Contain., 13, 313-327; Means et al., 1980, Environ. Sci. Technol., 14 (12), 1524-1528; Allen-King et al., 2002, Adv. Water Resour., 25 (8-12), 985-1016).

The current strategies available for cleanup of PAHs in the surface and subsurface environment include site excavation, inoculation of soil with PAH-degrading bacteria, (Schwartz and Scow, 2001, Biodegradation, 12 (3), 201-207) and in situ remediation using highly reactive zero-valent iron ($Fe^0$), bimetallic $Fe^0$/Pd, or catalytic (Au/Pd) (Nutt et al., 2005 Environ. Sci. Technol., 39 (5), 1346-1353; Nutt et al., 2006,69 (1-2), 115-125) nanoparticles (NPs) that chemically transform the organic toxins into innocuous compounds (Lowry, G. V. Nanomaterials for Groundwater Remediation, in *Environmental Nanotechnology*; Wiesner and Bottero, Eds.; McGraw Hill: New York, 2007; pp 297-336; U.S. DOE, Guidance for Optimizing Ground Water Response Actions at Department of Energy Sites; 2005; Liu et al., 2005, Chem. Mater., 17 (21), 5315-5322; Liu et al., 2005, Environ. Sci. Technol., 39 (5), 1338-1345). For in situ remediation, NPs must be transported to the contaminant source, typically through saturated porous media or through variably saturated (vadose zone) permeable media. Transport distances for NPs under those conditions can be short, from a few centimeters for nanoscale zero-valent iron (NZVI) to a few meters for carbon NPs (Lecoanet et al., 2004, Environ. Sci. Technol., 38 (19), 5164-5169; Lecoanet and Wiesner, 2004, Environ. Sci. Technol., 38 (16), 4377-4382). Enhanced transport occurs when the colloidal stability of the NPs is increased, often through the use of water-soluble polymers or block copolymers (Schrick et al., 2004, Chem. Mater., 16 (11), 2187-2193; Saleh et al., 2007, Environ. Eng. Sci., 24 (1), 45-57) and surfactant micelles (Quinn et al., 2005, Environ. Sci. Technol., 39 (5), 1309-1318). Polymeric nanonetwork adsorbent NPs (e.g., polyurethane or poly(ethylene) glycol modified urethane-based polymers) (Tungittiplakorn et al., 2004, Environ. Sci. Technol., 38 (5), 1605-1610; Tungittiplakorn et al., 2005, Environ. Sci. Technol., 39 (5), 1354-1358) solubilize the hydrophobic contaminant and contain a hydrophilic component that provides steric stabilization for suspension of the NPs in aqueous media.

However, currently used NPs and methods for their suspension for environmental remediation have the following concerns. First, these NPs are highly unstable under ambient conditions so that their reactivity to organic toxins is dramatically decreased by aging or oxidation. Furthermore, there may be unfavorable ecological effects of zero-valent iron, (Adeleye et al., 2013, J. Nanopart. Res., 15 (1), 1418:1-18) such as toxicity to freshwater and marine organisms (Phenrat et al., 2009, Environ. Sci. Technol., 43 (1), 195-200) and potential neurotoxicity. Second, the use of water-soluble polymers that are not readily biodegradable or recyclable is not a sustainable way to resolve complicated environmental problems. Last, they are at an economic disadvantage for application to large contaminated areas, for example current costs can be between $50/kg and $110/kg for nano-iron.

The removal of PAHs is complicated by their low water solubility and strong adsorption onto environmental surfaces (Means, et al., 2000, Environ. Sci. Technol., 34 (20), 4363-4369; Poerschmann et al., 2000, Environ. Sci. Technol., 34 (17), 3824-3830; Xia and Pignatello, 2001, Environ. Sci. Technol., 35 (1), 84-94; Means et al., 1980, Environ. Sci. Technol., 14 (12), 1524-1528). In aquatic environments, hydrophobic contaminants such as PAHs sorb from water onto natural organic matter (NOM) (Wershaw, 1986, J. Contam. Hydrol., 1, 29-45; Cornelissen et al., 2005, Environ. Sci. Technol., 39 (18), 6881-6895; Yang, 2008, Environ. Pollut., 156 (3), 1357-1363), and also onto clays and minerals (Hundal et al., 2001, Environ. Sci. Technol., 35 (17), 3456-3461; Meleshyn and Tunega, 2011, Geoderma, 169, 41-46; Mader and Goss, 1997, Environ. Sci. Technol., 31 (4), 1079-1086; Su et al., 2006, Environ. Sci. Technol., 40 (22), 6949-6954; Muller et al., 2007, Eur. J. Soil Sci., 58 (4), 918-931), particularly when there is little organic carbon present (Pei et al., 2012, J. Hazard. Mater., 203-204 (0), 137-144; Piatt et al., 1996, Environ. Sci. Technol., 30 (3), 751-760), and then accumulate in soils and sediments (Yang et al., 2008, Environ. Pollut., 156 (3), 1357-1363). PAHs preferentially bind to NOM, which in turn can also interact with naturally occurring inorganic NPs. Components of NOM include humin and humic acid, and lipids and their degradation products (e.g., fatty acids).

Thus, there is a continuing need in the art for methods of environmental remediation that use environmentally friendly compositions to absorb, degrade, and/or remove contaminants from the environment. The present invention addresses this continuing need in the art.

SUMMARY OF THE INVENTION

Described herein are compositions and methods for environmental remediation using nanoparticle supported lipid bilayer (NP-SLB) compositions. In one embodiment, the method of environmental remediation comprises: contacting a contaminated material with a remediation composition, said remediation composition comprising a nanoparticle supported lipid bilayer (NP-SLB) composition, wherein the remediation composition absorbs one or more contaminants from said contaminated material. In one embodiment, the NP-SLB composition is a nanoparticle having a single lipid bilayer attached thereto. In one embodiment, the NP-SLB composition is a nanoparticle having multiple lipid bilayers attached thereto. In one embodiment, the NP-SLB composition comprises a mixture of single lipid bilayer nanoparticles and multiple lipid bilayer nanoparticles. In one embodiment, the remediation composition further comprises small unilamellar vesicles (SUVs) or large unilamellar vesicles (LUVs). In one embodiment, at least a portion of the SUVs or LUVs are attached to an NP-SLB. In one embodiment, the remediation composition further comprises multilamellar vesicles (MLVs). In one embodiment, at least a portion of the MLVs are attached to an NP-SLB. In one embodiment, the NP-SLB composition is a nanaoparticle cluster having a single lipid bilayer attached thereto. In one embodiment, the NP-SLB composition is a nanoparticle cluster with multiple lipid bilayers attached thereto. In one embodiment, the lipid in the lipid bilayers used for the NP-SLBs, SUVs, and/or MLVs is 1,2-dimyristoyl-sn-glycero-3-phosphocholine (DMPC). In one embodiment, the lipid in the lipid bilayers used for the NP-SLBs, SUVs, LUVs, and/or MLVs is 1,2-dioleoyl-sn-glycero-3-phosphocholine (DOPC). In one embodiment, the lipid in the lipid bilayers used for the NP-SLBs, SUVs, LUVs, and/or MLVs can be any phosphocholine lipid. In one embodiment, the lipid in the lipid bilayer used for the NP-SLBs, SUVs, LUVs, and/or MLVs can be any saturated or unsaturated zwitterionic or ionic lipid. In one embodiment, the lipid bilayer used for the NP-SLBs, SUVs, LUVs, and/or MLVs can include any mixture of saturated or unsaturated zwitterionic or ionic lipids. In one embodiment, the nanoparticle comprises silica. In one embodiment, the nanoparticle comprises a metal oxide. In one embodiment, the metal oxide is an iron oxide. In one embodiment, the metal oxide is manganese oxide. In one embodiment, the one or more contaminants is an organic material. In one embodiment, the one or more contaminants is a polycyclic aromatic hydrocarbon (PAH). In one embodiment, the method further comprises the step of degrading or decomposing the NP-SLB composition. In one embodiment, the method further comprises the step of degrading or decomposing said one or more contaminants. In one embodiment, the method further comprises the step of separating at least a portion of the remediation composition from the contaminated material after the one or more contaminants are absorbed from the contaminated material.

BRIEF DESCRIPTION OF THE DRAWINGS

The following detailed description of preferred embodiments of the invention will be better understood when read in conjunction with the appended drawings. For the purpose of illustrating the invention, there are shown in the drawings embodiments which are presently preferred. It should be understood, however, that the invention is not limited to the precise arrangements and instrumentalities of the embodiments shown in the drawings.

FIG. 4A is a graph showing Nano-DSC traces of DMPC-MLVs prepared with BaP in molar ratios of lipid/BaP of 100/1 to 2.5/1 (neat DMPC-MLVs are shown for comparison). FIG. 4B is a graph showing Nano-DSC traces of DMPC-NP-SLBs $SA_{SUV}/SA_{SiO2}=2/1$ prepared with BaP in molar ratios of lipid/BaP of 100/1 to 5/1 (neat DMPC-NP-SLBs are shown for comparison). Structure of benzo[a]-pyrene (BaP) is shown as inset.

FIG. 5A is a graph showing DMPC-SUVs prepared with BaP in molar ratios of lipid/BaP of 100/1 to 2.5/1. Neat DMPC-MLVs are shown for comparison. FIG. 5B is a graph showing Nano-DSC traces of DMPC-NP-SLBs ($SA_{SUV}/SA_{SiO2}=1/1$) prepared with BaP in molar ratios of lipid/BaP of 100/1 to 5/1. Neat DMPC-NP-SLBs ($SA_{SUV}/SA_{SiO2}=1/1$) are shown for comparison.

FIG. 6A is a graph showing dynamic light scattering (DLS) data (volume averages) of DMPC-SUVs as a function of HA concentration. FIG. 6B is a graph showing nano-DSC traces of DMPC-SUVs as a function of HA concentration. [DMPC]=1 mg/mL

FIG. 8A is a graph of a nano-DSC trace of DMPC-SUVs with and without HA. FIG. 8B is a graph of a nano-DSC trace of DMPC-NP-SLBs ($SA_{SUV}/SA_{SiO2}=2/1$) with and without HA. [HA]=0.5 mg/mL, [DMPC]=1 mg/mL. Also shown in the middle of each graph are calibration samples made with BaP.

FIG. 9A is a graph of DLS data of time dependent DMPC-SUVs and DMPC-SUVs with HA. FIG. 9B is a graph of nano-DSC traces of time dependent DMPC-SUVs and DMPC-SUVs with HA. [HA]=0.5 mg/mL, [DMPC]=1 mg/mL.

FIG. 10A is a graph of nano-DSC traces of DMPC-SUVs. FIG. 10B is a graph of nano-DSC traces of DMPC-NP-SLBs ($SA_{SUV}/SA_{SiO2}=2/1$). Also shown in the middle of each graph are data for calibration samples made with BaP in ratios of lipid/BaP=20/1.

DETAILED DESCRIPTION

Figure 1:
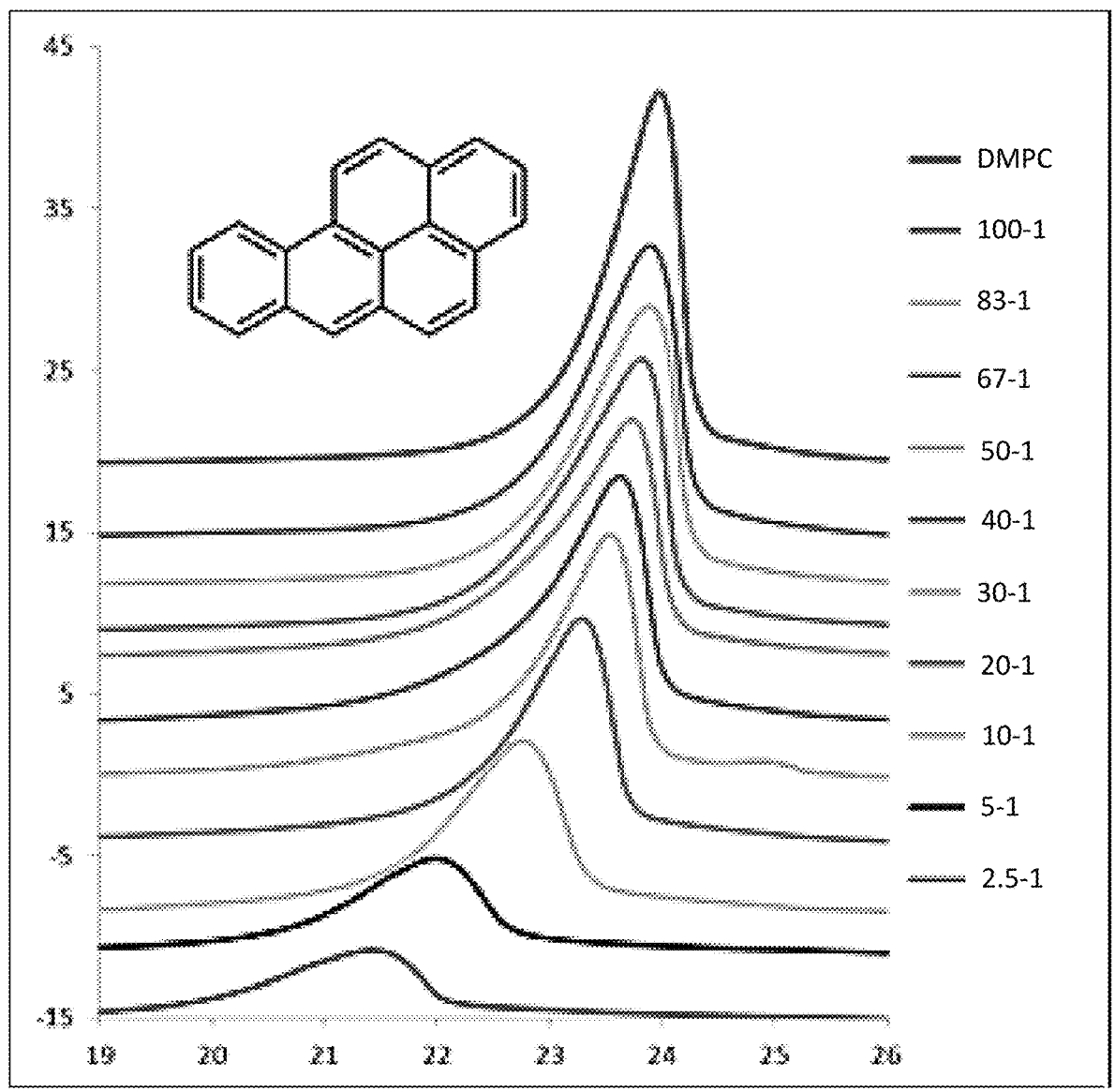
FIG. 1 is a graph showing Nano-DSC traces of DMPC (top) and benzo[a]pyrene (BaP), as an example of a hydrophobic contaminant, in DMPC SUVs as a function of DMPC/bap molar ratio (in descending order).
Figure 2:
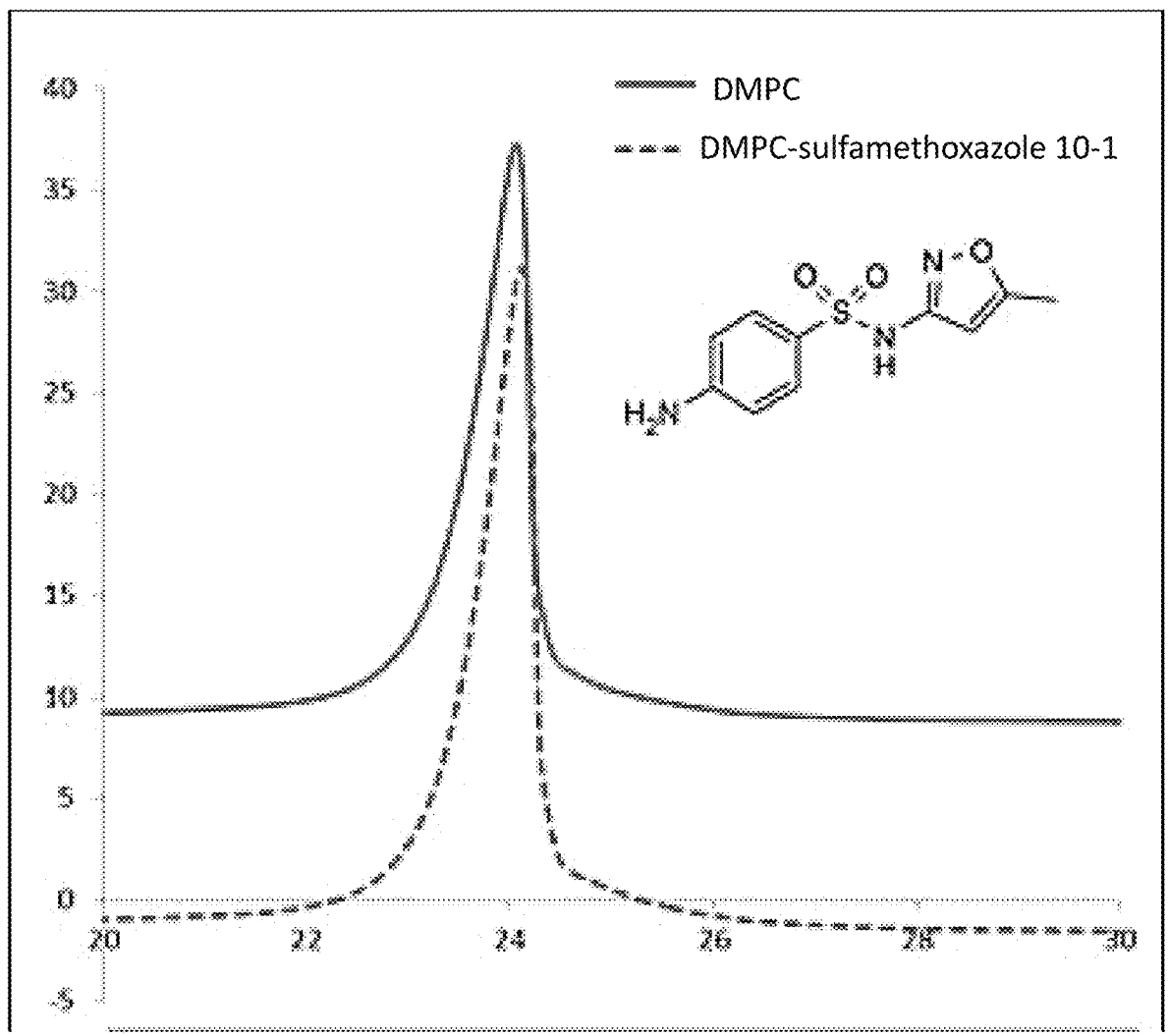
FIG. 2 is a graph showing Nano-DSC plots of DMPC and DMPC/sulfamethaoxazole.
Figure 3:
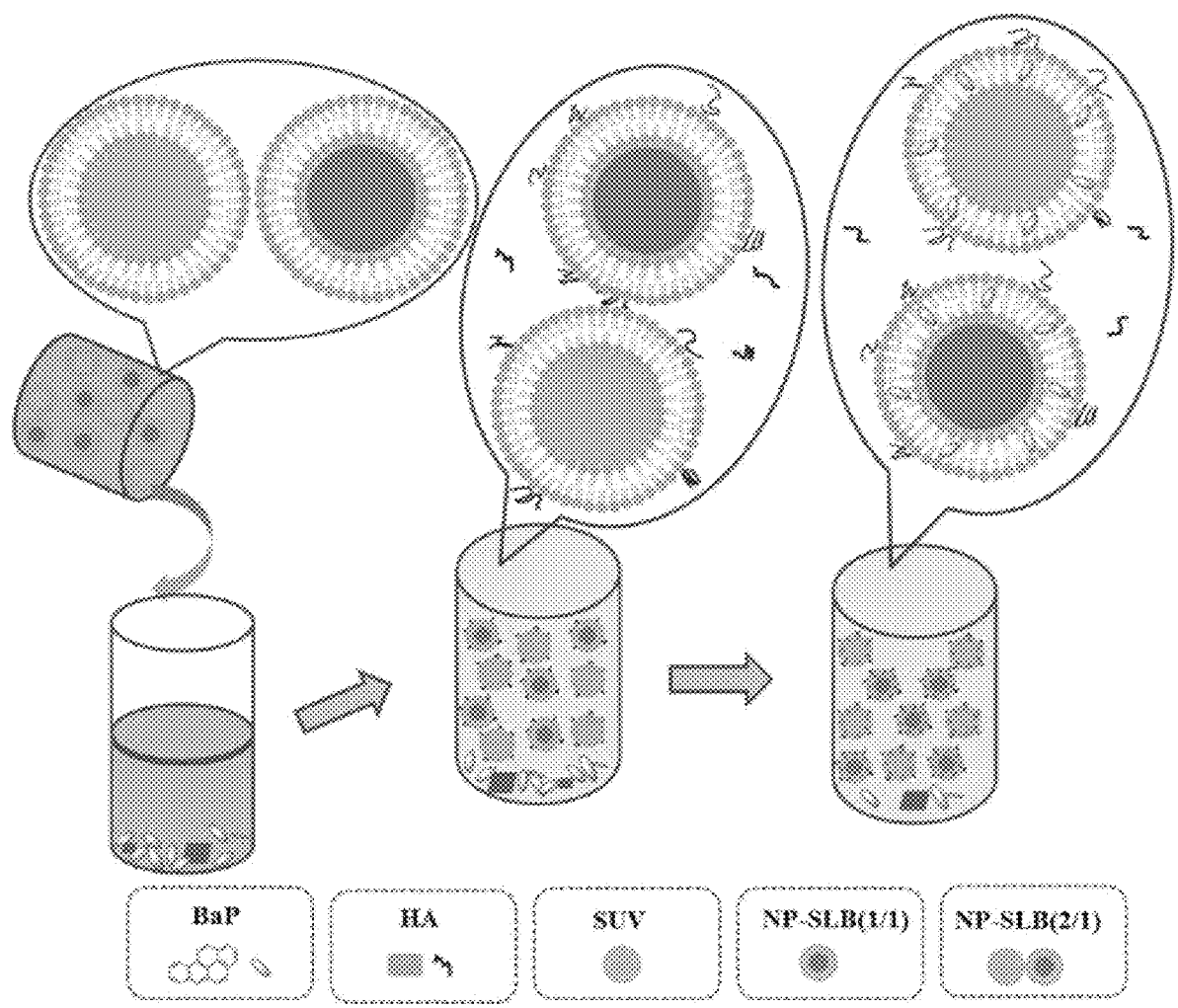
FIG. 3 is an illustration of an environmental remediation method using exemplary lipid bilayer nanoparticles and SUVs.

It is to be understood that the figures and descriptions of the present invention have been simplified to illustrate elements that are relevant for a clear understanding of the present invention, while eliminating, for the purpose of clarity, many other elements found in the art related to water treatment, environmental remediation, organic chemistry, nanoparticle chemistry, lipid chemistry, and the like. Those of ordinary skill in the art may recognize that other elements and/or steps are desirable and/or required in implementing the present invention. However, because such elements and steps are well known in the art, and because they do not facilitate a better understanding of the present invention, a discussion of such elements and steps is not provided herein. The disclosure herein is directed to all such variations and modifications to such elements and methods known to those skilled in the art.

Unless defined otherwise, all technical and scientific terms used herein have the same meaning as commonly understood by one of ordinary skill in the art to which this invention belongs. Although any methods, materials and components similar or equivalent to those described herein can be used in the practice or testing of the present invention, the preferred methods and materials are described.

As used herein, each of the following terms has the meaning associated with it in this section.

The articles "a" and "an" are used herein to refer to one or to more than one (i.e., to at least one) of the grammatical object of the article. By way of example, "an element" means one element or more than one element.

"About" as used herein when referring to a measurable value such as an amount, a temporal duration, and the like, is meant to encompass variations of ±20%, ±10%, ±5%, ±1%, or ±0.1% from the specified value, as such variations are appropriate.

As used herein, the term "phospholipids" refers to any member of a large class of fatlike organic compounds that in their molecular structure resemble the triglycerides, except for the replacement of a fatty acid with a phosphate-containing polar group. One end of the molecule is soluble in water (hydrophilic) and water solutions. The other, fatty acid, end is soluble in fats (hydrophobic). In watery environments, phospholipids naturally combine to form a two-layer structure (lipid bilayer) with the fat-soluble ends sandwiched in the middle and the water-soluble ends sticking out. Such lipid bilayers are the structural basis of cell membranes and liposomes.

Throughout this disclosure, various aspects of the invention can be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 2.7, 3, 4, 5, 5.3, 6 and any whole and partial increments therebetween. This applies regardless of the breadth of the range.

Description

Described herein are methods and compositions for water treatment and environmental remediation using nanoparticle supported lipid bilayers (NP-SLBs). The NP-SLBs can scavenge organic toxins, such as PCBs and PAHs, from contaminated water and soil by incorporating the toxins into the lipid bilayer. Lipids/fatty acids are an inexpensive and sustainable means to solubilize organic material, and thus are desirable for use in methods of bioremediation.

Predominantly hydrophobic organic toxins have limited or no solubility in aqueous media, making them unavailable for bioremediation by micro-organisms. Therefore, such insoluble organic contaminants are not readily degraded in currently available environmental remediation systems. While lipids/fatty acids can incorporate these contaminants, they are themselves biodegradable, and so may be degraded before solubilizing the organic contaminants. However, lipids on nanoparticles have greater stability compared with free lipids or lipid vesicles. If sufficient lipid is adsorbed onto the nanoparticles, the lipids can be made colloidally stable. Accordingly, these stable lipids are suitable as carriers at contaminated sites, where they can absorb hydrophobic organic toxins bound to NOM/humic substances. Once solubilized by the lipids on the NP-SLBs, the contaminants are more readily available for bioremediation by micro-organisms. If the NPs are themselves redox active, the SLBs can also serve to degrade the organic toxins in situ.

Compositions

The compositions of the present invention comprise supported lipid bilayers on nanoparticles (NP-SLBs). The compositions can also include unsupported lipid bilayers. In one embodiment, the lipid is a phosphatidylcholine lipid. As used herein, the term "phosphatidylcholine lipid" refers to a phospholipid having a choline headgroup. Phosphatidylcholine lipids useful for the compositions can include any synthetic or naturally-derived phosphocholines. In one embodiment, the lipid bilayers of the compositions of the present invention can include 1,2-dimyristoyl-sn-glycero-3-phosphocholine (DMPC). In another embodiment, the lipid bilayers of the compositions of the present invention can include 1,2-dioleoyl-sn-glycero-3-phosphocholine (DOPC). In another embodiment, the lipid bilayers can include a mixture of DMPC and DOPC. In yet another embodiment, the lipid bilayers can include a mixture of any phosphocholine lipids.

In other embodiments, the compositions can include any other lipid suitable for forming a lipid bilayer that can be adsorbed on a nanoparticle or other substrate, as would be understood by a person skilled in the art, for example any saturated or unsaturated zwitterionic or ionic lipid. Non-limiting examples of phosphatidylcholine lipids include L-α-phosphatidylcholine (1,2-diacyl-sn-glycero-3-phosphocholine), 1,2-distearoyl-sn-glycero-3 phosphocholine (distearoylphosphatidylcholine; DSPC), 1,2-dipalmitoyl-sn-glycero-3 phosphocholine (dipalmitoylphosphatidylcholine; DPPC), 1-myristoyl-2-palmitoyl-sn-glycero-3 phosphocholine (MPPC), 1-palmitoyl-2-myristoyl-sn-glycero-3 phosphocholine (PMPC), 1-myristoyl-2-stearoyl-sn-glycero-3 phosphocholine (MSPC), 1-palmitoyl-2-stearoyl-sn-glycero-3 phosphocholine (PSPC), 1-stearoyl-2-palmitoyl-sn-glycero-3 phosphocholine (SPPC), and 1-stearoyl-2-myristoyl-sn-glycero-3 phosphocholine (SMPC). In one embodiment, the phosphatidylcholine lipid is L-α-phosphatidylcholine.

Examples of unsaturated phosphatidylcholine lipids include, but are not limited to, 1-palmitoyl-2-oleoyl-sn-glycero-3-phosphocholine (palmitoyloleoylphosphatidylcholine; POPC), 1-palmitoyl-2-linoleoyl-sn-glycero-3-phosphocholine, 1-stearoyl-2-oleoyl-sn-glycero-3-phosphocholine (palmitoyloleoylphosphatidylcholine; SOPC), 1-stearoyl-2-linoleoyl-sn-glycero-3-phosphocholine, 1-oleoyl-2-myristoyl-sn-glycero-3-phosphocholine (OMPC), 1-oleoyl-2-palmitoyl-sn-glycero-3-phosphocholine (OPPC), and 1-oleoyl-2-stearoyl-sn-glycero-3-phosphocholine (OSPC). Other lipid extracts, such as egg phosphatidylcholine lipid, heart extract, brain extract, liver extract, soy phosphatidylcholine lipid, and hydrogenated soy phosphatidylcholine lipid (HSPC) may also be useful in the present invention. In one embodiment, the lipid can be a poly(ethylene glycol)-lipid derivative (PEG-lipid).

The preparation and characterization of one embodiment of the NP-SLB compositions of the present invention is described in Savarala et al., 2010, Langmuir, 26(14):12081-12088, which is hereby incorporated by reference in its entirety. Savarala describes the formation of NP-SLBs from 20-100 nm silica nanobeads with supported lipid bilayers of DMPC. In one embodiment, a single bilayer of DMPC was fused to the silica nanobeads, thereby increasing the size of the nanobeads by approximately 8 nm. Such NP-SLBs are generally colloidally stable, i.e., the lipids in the NP-SLBs remain attached to the nanoparticles for a significant amount of time and they do not degrade as quickly as free lipids. Formation of multiple bilayers, adsorption of lipid vesicles to the NP-SLBs, or stable aggregates of NPs surrounded by lipid bilayers can also be used. Therefore, these compositions are useful for environmental remediation where the lipids can be used to absorb and remove organic contaminants that are insoluble in water.

The nanoparticle portion of the compositions of the present invention can comprise any material suitable for receiving or supporting a lipid bilayer. In one embodiment, the nanoparticle substrate comprises silica ($SiO_2$), which serves as an inexpensive carrier for the lipids. In another embodiment, the nanoparticles can comprise a metal oxide, for example, but not limited to iron oxide or manganese oxide, which can further serve the function of oxidizing toxins. In such an embodiment, the lipids adsorbed on the iron or manganese oxides serve as carriers to contaminated sites, and once the lipids are removed and/or degraded, the remaining NPs can oxidize organic species, especially polar organic species. In one embodiment, the nanoparticle portion can be a cluster and/or mixture of multiple nanoparticles. In one such embodiment, the cluster or mixture of nanoparticles can include more than one species of nanoparticle, for example both silica and iron oxide nanoparticles. However, the nanoparticle portion of the compositions of the present invention is not limited to any specific substrate identified herein.

In one embodiment, the composition can include two or more different types of NP-SLBs. For example, the composition can include DMPC as the lipid and $SiO_2$ as the nanoparticle in one type of NP-SLB, while also including another type of NP-SLB that includes $SiO_2$ as the nanoparticle and a lipid other than DMPC. Accordingly, the composition can include any mixture of different types of NP-SLBs, having any combination of nanoparticles and/or lipids, as would be understood by a person skilled in the art.

In various embodiments, the nanoparticle portion of the present invention can comprise any shape, size, degree of aggregation, or material suitable for forming a single lipid bilayer, multiple bilayer, SLB with adsorbed vesicles and/or a colloidally stable composition. In a preferred embodiment, the nanoparticle portion comprises silica particles in the range of about 20-100 nm. In another embodiment, the nanoparticle portion can comprise a silica particle that is greater than 100 nm or less than 20 nm, for example, but not limited to, 105, 110, 120, 130, 140, 150, 160, 170, 180, 190, 200 nm or larger, or 19, 18, 17, 16, 15, 14, 13, 12, 11, 10, 9, 8, 7, 6, 5 nm or smaller, or any value in between. In various embodiments, the size and/or shape of the nanoparticle portion of the present invention can be modified based on a number of factors, including, but not limited to: the characteristics of the material of composition of the nanoparticle, the material of composition of the lipid bilayer that will be attached to the nanoparticle, and the type of contaminant(s) present in the environment that will be remediated. In one embodiment, the nanoparticle portion can include a distribution of different particles sizes. It is contemplated herein that a person skilled in the art could readily modify the composition, size, and/or shape of the nanoparticle portion of the composition to optimize the nanoparticle portion for forming a NP-SLB suitable for the methods described herein.

The compositions described herein generally comprise renewable (lipids/fatty acids) and/or environmentally friendly ($SiO_2$, manganese, and iron oxide) constituents. The lipids/fatty acids can be readily biodegraded after absorbing contaminants, unlike the hydrophobic cores made from polymers that are used in other environmental remediation systems and methods. In addition, when the lipid/fatty acid layer of the compositions is removed and/or degraded from the nanoparticle portion of the NP-SLBs, the resulting nanoparticles do not further contaminate the site to be remediated because these nanoparticles generally comprise non-toxic or environmentally friendly materials. Accordingly, the use of such renewable and environmentally friendly materials make the compositions highly desirable for soil and water remediation systems, where sustainability is an important factor.

Further, the compositions described herein can include additional materials or components, as would be understood by a person skilled in the art. For example, in one embodiment, the compositions can include other materials suitable for environmental remediation. In some embodiments, the compositions can include lipids in forms other than NP-SLBs. For example, in one embodiment, the composition can include SUVs, LUVs, and/or MLVs, i.e., unsupported lipid bilayers. The SUVs, LUVs, and/or MLVs can include the same lipids used for the NP-SLBs, or the SUVs, LUVs, and/or MLVs can include different lipids than those used for the NP-SLBs. Accordingly, as would be understood by a person skilled in the art, any combination of lipids can be used for the SUVs, LUVs, MLVs, or NP-SLBs. In one embodiment, the SUVs, LUVs, and/or MLVs can be attached to the NP-SLBs. In other embodiments, the compositions can include ethanol or any other alcohol. For example, ethanol can be used to increase the aqueous solubility of contaminants such as PAHs so that the uptake of the contaminants by the SUVs, LUVs, MLVs, or NP-SLBs is increased.

Methods

The methods of the present invention relate to the removal or in situ degradation of contaminants from soil or water, i.e., environmental remediation. In one embodiment, the method comprises the step of exposing or contacting a contaminated material to a remediation composition including a NP-SLB composition, wherein the remediation composition absorbs organic contaminant from the contaminated material. In one embodiment, the method can further comprise the step of degrading or removing the organic contaminant from the NP-SLB composition. In another embodiment, the nanoparticle portion of the NP-SLB composition can be used to oxidize a contaminant after the lipid bilayer portion of the NP-SLB composition has been removed from the NP-SLB composition. In one embodiment, the remediation composition can include other materials or components in addition to NP-SLBs.

The methods of the present invention can further comprise steps that a person skilled in the art would understand to be necessary or desirable for an environmental remediation or water treatment process, including, but not limited to: filtering or removing the NP-SLBs from the environmental media after they have captured organic toxins.

EXPERIMENTAL EXAMPLES

The invention is further described in detail by reference to the following experimental examples. These examples are provided for purposes of illustration only, and are not intended to be limiting unless otherwise specified. Thus, the invention should in no way be construed as being limited to the following examples, but rather, should be construed to encompass any and all variations which become evident as a result of the teaching provided herein.

Without further description, it is believed that one of ordinary skill in the art can, using the preceding description and the following illustrative examples, make and utilize the compositions of the present invention and practice the claimed methods. The following working examples therefore, specifically point out the preferred embodiments of the present invention, and are not to be construed as limiting in any way the remainder of the disclosure.

Example 1

Supported Lipid Bilayer Nanoparticles for Remediation of Organic Toxins

A potential method for remediation of PCBs and PAHs is to scavenge them using nanoparticle supported lipid bilayers (NP-SLBs). It is proposed that PCB/PAH incorporation into the bilayer will increase the bioavailabilty of the PAH/PCBs. Here, it is demonstrated that the PCBs/PAHs can be incorporated into NP-SLBs.

Materials and Methods 1,2-dimyristoyl-sn-glycero-3-phosphocholine (DMPC) (Avanti Polar Lipids), organic toxins, e.g., benzo[a]pyrene and sulfamethoxazole, and solvents (Sigma-Aldrich) were used as received. DMPC and organics were mixed in chloroform as a function of molar ratio lipid/organic. Films were formed after chloroform was evaporated under $N_2$ flow and further dried under vacuum. The films were then hydrated with HPLC-grade water. Multilamellar vesicles (MLVs) were freeze thawed and extruded using 100 nm polycarbonate filters to form small unilamellar vesicles (SUVs). Nanoparticle supported lipid bilayers (NP-SLBs) were formed by fusion of the SUVs with $SiO_2$ nanoparticles (Nissan Chemical) after incubation for 1 h above the gel-to-liquid crystal phase transition temperature, $T_m$ (=24° C.) of the DMPC. $T_m$ was obtained by nano-differential scanning calorimetry (nano-DSC), and SUV sizes/zeta potentials by dynamic light scattering (DLS) using a Malvern Zetasizer Nano-ZSP.

Results

Nano-DSC scans for DMPC, and benzo[a]pyrene (FIG. 1) or sulfamethoxazole (FIG. 2) incorporated into DMPC MLVs show that there is a downward shift in $T_m$ that depends on the amount of incorporation of the organic substance into the bilayer (FIG. 1), and also depends on the structure/polarity of the organic material (FIG. 2). The completely hydrophobic benzo[a]pyrene (bap) can be incorporated to at least a 2.5/1 lipid/benzo[a]pyrene molar ratio, where $T_m$ decreases and broadens with decreasing molar ratio of BaP/lipid, while there is minimal or no incorporation of the polar sulfamethoxazole. SUVs and NP-SLBs show similar trends, but the $T_m$s are both broadened and further shifted down in temperature. DLS data indicated SUV sizes increased slightly and /-zeta potentials remained almost constant with organic incorporation.

Conclusion

PCBs/PAHs can be incorporated into small unilamellar vesicles (SUVs) and NP-SLBs, where $T_m$ of the lipids shift in proportion to the molar ratios of lipid/organic. Hydrophobic benzo[a]pyrene could be incorporated to at least a ratio of 2.5/1 lipid/benzo[a]pyrene, presumably in the tail region of the vesicles, while sulfamethoxazole was incorporated to a smaller extent.

Example 2

Nanoparticle-Supported Lipid Bilayers as an In Situ Remediation Strategy for Hydrophobic Organic Contaminants in Soils A method for the remediation of persistent hydrophobic contaminants, using benzo[a]pyrene (BaP) is investigated (FIG. 4) as an example of a common PAH, from contaminated surface and subsurface soils. The method is based on inexpensive, naturally occurring nanoparticle (NP) silica (SiO2) and lipids, which form nanoparticle-supported lipid bilayers (DMPC-NP-SLBs). In one embodiment, the lipid used is 1,2-dimyristoyl-sn-glycero-3-phosphocholine (DMPC). DMPC-NP-SLBs are small, with high surface-to-volume ratios, so that their interactions with each other and with other lipids and organic and mineral fractions in the soil environment are dominated by their surface properties and aggregation states. Here, the lipids in the DMPC-NP-SLBs provide both the method of remediation, namely to adsorb and sequester the BaP, and the colloidal stability necessary for transport to the contaminant source. Although lipids in the form of vesicles, e.g. small unilamellar vesicles (SUVs), have better colloidal stability than lipids on NP-SLBs (since the repulsive entropic forces in the former (Helfrich, 1978, Z. Naturforsch., A: Phys. Sci. 33 (3), 305-315) are suppressed when the lipids are on a rigid support (Savarala et al., 2010, Langmuir, 26 (14), 12081-12088; Dolainsky et al., 1993, J. Chem. Phys., 98 (2), 1712-20), the process of SLB formation can also occur on a variety of environmental surfaces, so that the SUVs may prematurely adsorb/fuse to soil components before arriving at the targeted remediation site. Lipids on NP-SLBs desorb from the $SiO_2$ at a much slower rate.

Because in soils PAH sorption occurs preferentially to soil organic matter (SOM), the interaction of BaP with DMPC-NP-SLBs in the presence and absence of humic acid (HA), one of the main components of SOM/NOM, are both investigated. The ability of *Pseudomonas aeruginosa* (*P. aeruginosa*), a Gram-negative bacterium commonly found in soil and water environments, to use the lipids and BaP in the DMPC-NP-SLBs as carbon sources is demonstrated by bacterial growth studies.

Thus, DMCP-NP-SLBs can be used to solubilize and sequester hydrophobic organic toxins, making them available for in situ biodegradation (Pignatello, J. J., 2009, Bioavailability of contaminants in soil, in Advances in Applied Bioremediation; Singh, A., Kuhad, R. C., Ward, O.

P., Eds.; Soil Biology Ser.; Springer Berlin Heidelberg, Vol. 17, pp 35-71) or removal in the surface and subsurface soils, providing a sustainable and biodegradable method for remediation of these toxins. When both the lipids and organic contaminants sequestered in the lipids are biodegraded, only $SiO_2$, a natural component of soil, will remain.

The results described herein demonstrate that nanoparticle-supported lipid bilayers (NP-SLBs) may be an effective method for remediation of polycyclic aromatic hydrocarbons (PAHs), where the lipids provide both the method of extraction and stability for transport to the contaminant site. Nanoparticle-supported lipid bilayers (NP-SLBs) made of 100-nm $SiO_2$ nanoparticles and the zwitterionic lipid 1,2-dimyristoyl-sn-glycero-3-phosphocholine (DMPC) were investigated as constructs for removing PAHs from contaminated sites, using benzo[a]pyrene (BaP) as an example. DMPC in the form of small unilamellar vesicles (SUVs) or DMPC-NP-SLBs with excess DMPC-SUVs to support colloidal stability, when added to saturated BaP solutions, sorb BaP in ratios of up to 10/1 to 5/1 lipid/BaP, over a 2-week period at 33° C. This rate was found to increase with temperature. The presence of humic acid (HA) as an analog of soil organic matter was not found to affect the BaP uptake rate by DMPC-NP-SLBs and DMPC-SUVs. Although not wishing to be bound by any particular theory, this result suggests preferential BaP sorption into the hydrophobic lipids. HA increased the zeta potential of these nanosystems, but did not disrupt their morphology, and also enhances their colloidal stability. These results using the common soil bacteria *Pseudomonas aeruginosa* demonstrate viability and growth using DMPC-NP-SLBs and DMPC-SUVs, with and without BaP as their sole carbon source.

Materials and Methods

Materials 1,2-dimyristoyl-sn-glycero-3-phosphocholine (DMPC, 14:0 PC) (Avanti Polar Lipids, Alabaster, Ala.) was used without further purification. All solutions/suspensions were prepared with chloroform and 20 mM NaCl using HPLC-grade water (Fisher Chemicals, Fairlawn, N.J.). The humic acid, sodium salt (STBD5313 V), and benzo[a]pyrene (BaP) (SLBF4553 V), 98% purity, were obtained from Sigma-Aldrich. The 100-nm $SiO_2$ beads were received from Nissan Chemicals.

Preparation of Multilamellar (MLV) and Small Unilamellar (SUV) Vesicles

DMPC and BaP were separately dissolved in chloroform and mixed to produce varying lipid/BaP molar ratios (100/0 to 2.5/1) in order to provide calibration standards to estimate the amount of BaP uptake by the lipids. These solutions were dried under a nitrogen stream, followed by drying in a vacuum oven at room temperature overnight to remove any residual solvent. The films were hydrated at 50° C. (above Tm of DMPC) using 20 mM NaCl in HPLC grade water with constant shaking to produce multilamellar vesicles (DMPC-MLVs). The DMPC-MLVs underwent five freeze-thaw cycles followed by extrusion (40×) through a 100-nm polycarbonate membrane with a Mini-Extruder (Avanti Polar Lipids) to produce small unilamellar vesicles (DMPC-SUVs).

Preparation of Supported Lipid Bilayers

Supported lipid bilayers (SLBs) were prepared from nominal 100 nm $SiO_2$ beads and DMPC or DMPC with BaP. The DMPC-SUVs and $SiO_2$ were brought to the same temperature (40° C.) before mixing, after which the DMPC-SUV/$SiO_2$ mixtures were incubated for 1 h at 40° C. The amount of $SiO_2$ added was that required to achieve single bilayer coverage, i.e. where the surface area of the lipids in the SUVs (SASUV) is equal to the surface area of the $SiO_2$ beads ($SASiO_2$), i.e. $SASUV/SASiO_2$=1/1, or twice that amount, $SASUV/SASiO_2$=2/1.

BaP and DMPC-SUVs or DMCP-NP-SLBs with or without Humic Acid

Migration of BaP into DMPC-SUVs or DMPC-NP-SLBs (with or without humic acid) was investigated by mixing them with saturated BaP solutions (with solid BaP still observed), all at 20 mM NaCl. Concentration-dependent sorption (Braida et al., 2001, Environ. Sci. Technol. 35:2765-2772; Braida et al., 2002, Environ. Toxicol. Chem. 21:2573-2580) was not investigated.

Bacterial Strain and Media

Wild-type *Pseudomonas aeruginosa* strain PA01 HS was obtained from Professor Nancy Love (University of Michigan, Ann Arbor). The growth media (pH 7) were PAM9, with acetic acid as the sole carbon source, or the same media, referred to as M-PAM9, in which equivalent amounts of lipid or lipid+BaP (in the form of DMPC-SUVs or DMPC-NP-SLBs) were the sole carbon source. All culture media with additives were sterile-filtered through sterile PVDF 0.45-μm membranes or 0.2-μm filters (Acrodisc with Supor membranes, Pall Corp., Port Washington, N.Y.) right before use to remove precipitates that could interfere with particle size analyses and optical measurements.

PAM9 and M-PAM9 Growth Media

The media used was PAM9 minimal media consisting of the following in (g/L): $Na_2HPO_4$ (6), $NaH_2PO_4$ (3), $NH_4Cl$ (1), $CH_3COOH$ (0.94), NaCl (0.5), $MgSO_4.7H_2O$ (0.25); in mg/L: $CaCl_2.2H_2O$ (39), $KH_2PO_4$ (22), $FeSO_4.7H_2O$ (3.8), $Na_2EDTA.2H_2O$ (5), $ZnCl_2$ (0.25), $MnSO_4.H_2O$ (0.18); in μg/L: $CuCl_2.2H_2O$ (32), $NaMoO_4.2H_2O$ (6), $H_3BO_3$ (3), $CoCl_2.6H_2O$ (1). M-PAM9 media was formed in a similar manner as PAM9, however M-PAM9 was prepared without $CH_3COOH$ as the carbon source, which was replaced with equivalent amounts of lipid in the form of DMPC-SUVs, DMPC-NP-SLBs, DMPC-SUVs with BaP and DMPC-NP-SLBs with BaP (with lipid/BaP ratios of 20/1). All chemicals used in the media were reagent grade or higher. The final pH of the PAM9 media was adjusted to 7.0 with NaOH. The pH of the M-PAM9 media as prepared was 6.88, and was used without pH adjustment. All culture media with additives were sterile-filtered through sterile PVDF 0.45 μm membranes or 0.2 μm filters (Acrodisc with Supor membranes, Pall Co., NY, USA) right before use to remove precipitates that could interfere with particle size analyses and optical measurements.

PAM9 and M-PAM9 growth media were prepared as follows:

Preparation of Stock Solutions

1. Mixed Salt Stock Solution 17.25 g of $NaH_2PO_4.H_2O$, 56.65 g $Na_2HPO_4.7H_2O$, 5 g $NH_4Cl$ and 2.5 g NaCl were added to a 500 mL volumetric flask and HPLC water was added to volume mark.

2. Mg Stock Solution 12.03 g of $MgSO_4$ was added to a 100 mL volumetric flask and HPLC water was added to volume mark.

3. Ca Stock Solution 2.94 g of $CaCl_2$ was added into a 100 mL volumetric flask and HPLC water was added to volume mark.

4. K Stock Solution 1.11 g of $KH_2PO_4$ was added to a 50 mL volumetric flask and HPLC water was added to volume mark.

5. Acetic Acid Stock Solution 55.7 mL of acetic acid was added to a 250 mL volumetric flask and HPLC water was added to volume mark.

6. Iron-EDTA Stock Solution 1.88 g of $FeSO_4.7H_2O$ and 2.51 g of $Na_2EDTA.2H_2O$ were added to a 250 mL volumetric flask and HPLC water was added to volume mark.

7. Trace Metal Stock Solution 0.125 g of $ZnCl_2$, 0.102 g of $MnSO_4.2H_2O$, 0.016 g of $CuCl_2.2H_2O$, 0.003 g of $NaMoO4.2H_2O$, 0.001 g of $CoCl.6H_2O$, and 0.002 g of $H_3BO_3$ were added to a 500 mL volumetric flask and HPLC water was added to volume mark.

Preparation of PAM9

25 mL of mixed salt stock solution, 0.25 mL Mg stock solution, 0.25 mL Ca stock solution, 0.25 mL K stock solution, 0.25 mL trace metal stock solution, 0.125 mL iron-EDTA stock solution and 1 mL acetic acid stock solution were added to a 250 mL volumetric flask and HPLC water was added to volume mark. pH was adjusted to 7.0 using NaOH.

Preparation of M-PAM9

25 mL of mixed salt stock solution, 0.25 mL Mg stock solution, 0.25 mL Ca stock solution, 0.25 mL K stock solution, 0.25 mL trace metal stock solution, 0.125 mL iron-EDTA stock solution and 1 mL acetic acid stock solution were added to a 250 mL volumetric flask and HPLC water was added to volume mark The pH was measured as 6.88 and was not adjusted further.

Bacterial Growth Studies

In particular, DMPC-MLVs were hydrated at 10 mg/mL with and without BaP (mole ratio lipid/BAP=20:1), and extruded through 100 nm polycarbonate filters to make the DMPC-SUVs. All DMPC-SUVs were diluted to 4 mg/mL with M-PAM9. Half of the 4 mg/mL DMPC-SUVs were further diluted to 2 mg/mL with M-PAM9 and were ready for use in the bacterial growth experiments. The other half of the 4 mg/mL DMPC-SUVs were mixed with the same volume of 100 nm silica beads and were incubated at 35° C. for 1 h to make DMCP-NP-SLB (SASUV/SASiO$_2$=2/1), where the lipid concentration was also 2 mg/mL. The M-PAM9 media with the above 4 additives (DMPC-SUVs, DMPC-NP-SLBs, DMCP-SUV/BaP, and DMPC-NP-SLBs/BaP) as well as the culture media (650 µL) were then added into culture tubes and incubated for another 24 hours at 37° C. with constant shaking. The amount of carbon for each treatment was carefully calculated and made comparable with that of acetic acid in PAM9 to ensure that the same amount of carbon was provided for the bacteria growth. After another 24-hour incubation, bacterial cell growth was monitored by measuring OD600. All growth experiments were repeated twice.

A drop of bacterial cells with DMPC-NP-SLBs treated with BaP (labeled as 4S in Table 1) was then placed onto Ultrathin Carbon Type-A, 400-mesh copper TEM grids (Ted Pella, Inc. Lot 260813) and allowed to dry. When the samples had dried, the TEM grids were washed with distilled water to remove salts and allowed to dry under ambient conditions.

TABLE 1

Zeta Potentials (ζ) of Humic Acid (HA) Suspensions With and Without DMPC-SUVs

| | HA (mg/mL) | | | | | | | |
|---|---|---|---|---|---|---|---|---|
| | 0 | 0.025 | 0.050 | 0.075 | 0.10 | 0.12 | 0.25 | 0.50 |
| ζ (mV) of HA | NA | −33.4 | −39.6 | −43.0 | −44.8 | −46.4 | −45.3 | −46.8 |
| ζ (mV) of HA/SUV[a] | −2.0 | −15.7 | −23.4 | −21.6 | −20.7 | −24.5 | −35.3 | −37.7 |

[a]DMPC-SUVs concentration is always 1 mg/mL

Characterization

Nanodifferential scanning calorimetry (nano-DSC) measurements were obtained on a TA Instruments (New Castle, Del.) Nano DSC-6300, at cooling/heating rates of 1° C./min, using 1 mg of lipid in 20 mM NaCl. Dynamic light scattering (DLS) and zeta (ζ) potential data were obtained for the vesicles and DMPC-NP-SLBs (SASUV/SASiO$_2$=2/1) using a Malvern (Malvern Instrument Ltd. Malvern, U.K.) Zetasizer Nano-ZS. Diameters are reported either as z averages or volume distributions obtained by cumulant analysis (Drazenovic et al., 2014, Biochim. Biophys. Acta Biomembr. 1848:532-543). The concentrations used were the same as for the nano-DSC and the concentrations of humic acid are specified herein. All measurements were done at 25° C. Transmission electron microscopy (TEM) data were obtained on a JEOL JEM-1400 in the bright field mode at 120 kV to image bacterial cells and DMPC-NP-SLBs with BaP.

Results

Quantification of BaP Uptake by Vesicles and NP-SLBs.

To determine how much BaP could be incorporated into DMPC-MLVs/DMCP-SUVs and DMPC-NP-SLBs, they were prepared with varying molar ratios of BaP. DMPC-NP-SLBs with SASUV/SASiO$_2$=1/1, or twice that amount (SASUV/SASiO$_2$=2/1), were used. When the surface area of the lipids in the SUVs (SASUV) is the same as the nominal surface area of the added SiO$_2$-NPs (SASiO$_2$), SASUV/SASiO2=1, the amount of lipid is just that required to form a single DMPC-NP-SLB around the nominal 100 nm SiO$_2$. When SASUV/SASiO$_2$=2/1, a single DMPC-NP-SLB and a DMPC-SUV are formed on average, and it has been previously demonstrated that the DMCP-SUV is adsorbed to the DMPC-NP-SLB (Drazenovic et al., 2014, Biochim. Biophys. Acta Biomembr. 1848:532-543). When SASUV/SASiO$_2$=1/1, the DMPC-NP-SLBs are suspended in water, but precipitate at ionic strengths >10 mM NaCl, while when SASUV/SASiO$_2$=2/1, the nanosystems remain suspended at higher ionic strength (up to 100 mM NaCl tested). Nanosystems prepared with incorporated BaP in molar ratios of lipid/BaP of 2.5/1 to 100/1 provide the calibration plots necessary to determine how much BaP sorbed into the DMPC-SUVs and DMCP-NP-SLBs when saturated BaP solutions were added to and incubated with pure DMCP-SUVs or DMCP-NP-SLBs.

In one aspect, Nano-DSC provides a method of monitoring inclusion of impurities in lipid bilayers since they perturb the main gel-to-liquid crystalline phase transition temperature, Tm, typically by increasing the disorder of the alkyl chains, and thus lowering Tm. Nano-DSC has the advantage that it does not require labeled probes for the impurities and is only sensitive to impurities actually included in the bilayer rather than free impurities in the aqueous phase, which may be in equilibrium with impurities in the bilayer. In the case of BaP, which has very limited water solubility, it is hypothesized that the equilibrium is predominantly in the direction of the hydrophobic alkyl interior of the bilayer. However, contaminants can be measured by methods other than nano-DSC, for example, but not limited to GC or LC-MS.

Figure 4:
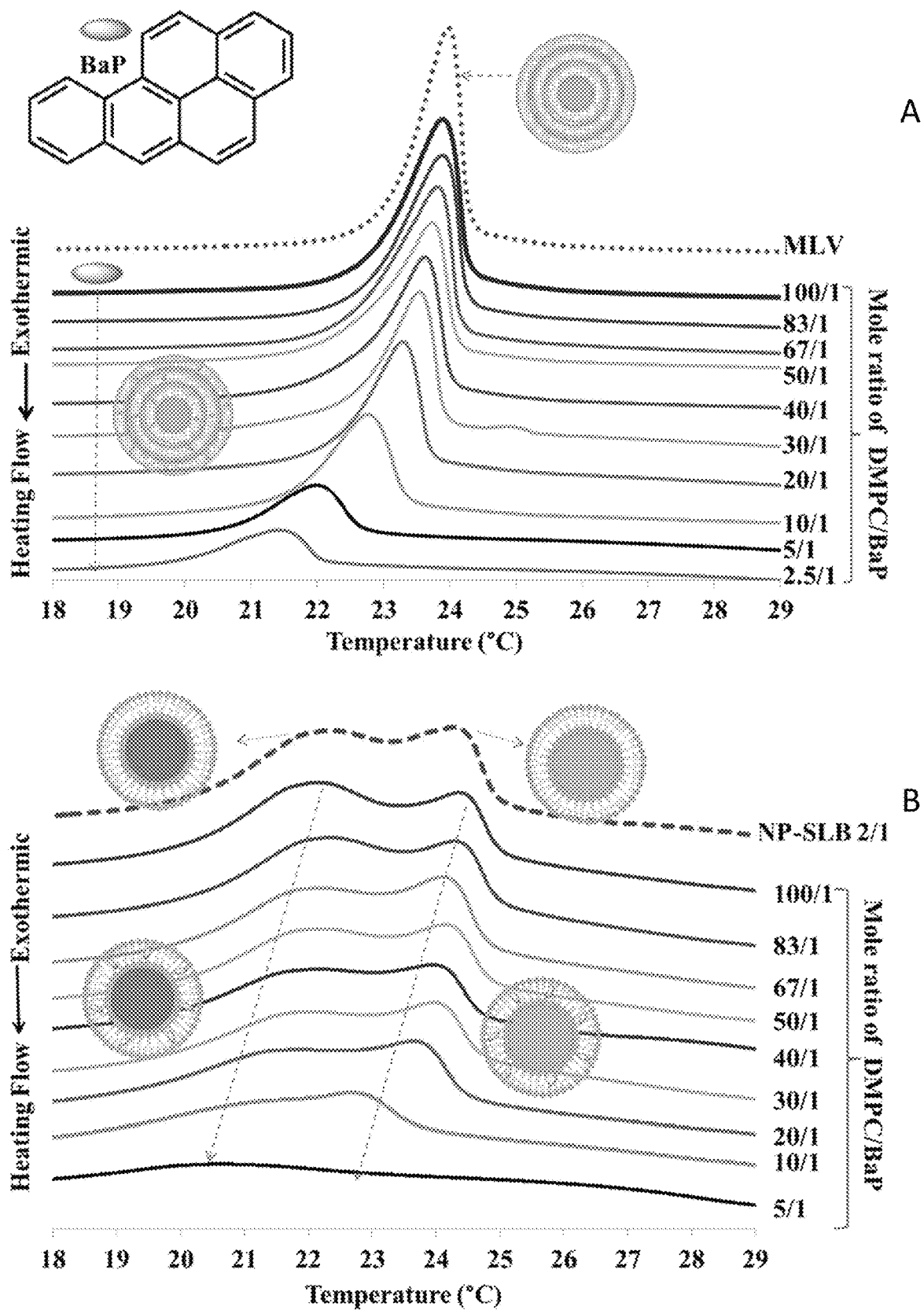
FIG. 4, comprised of FIGS. 4A-4B, depicts Nano-DSC traces of DMPC-MLVs and DMPC-NP-SLBs with $SA_{SUV}/SASiO_2=2/1$. Here, $SA_{SUV}$ is the nominal surface area of the lipids, $SA_{SiO2}$ is the nominal surface area of the $SiO_2$, so that $SA_{SUV}/SA_{SiO2}=1/1$ indicates the amount of lipid present should just cover the $SiO_2$ nanoparticles, and $SA_{SUV}/SA_{SiO2}=2/1$ there is twice as much lipid present.
Figure 5:
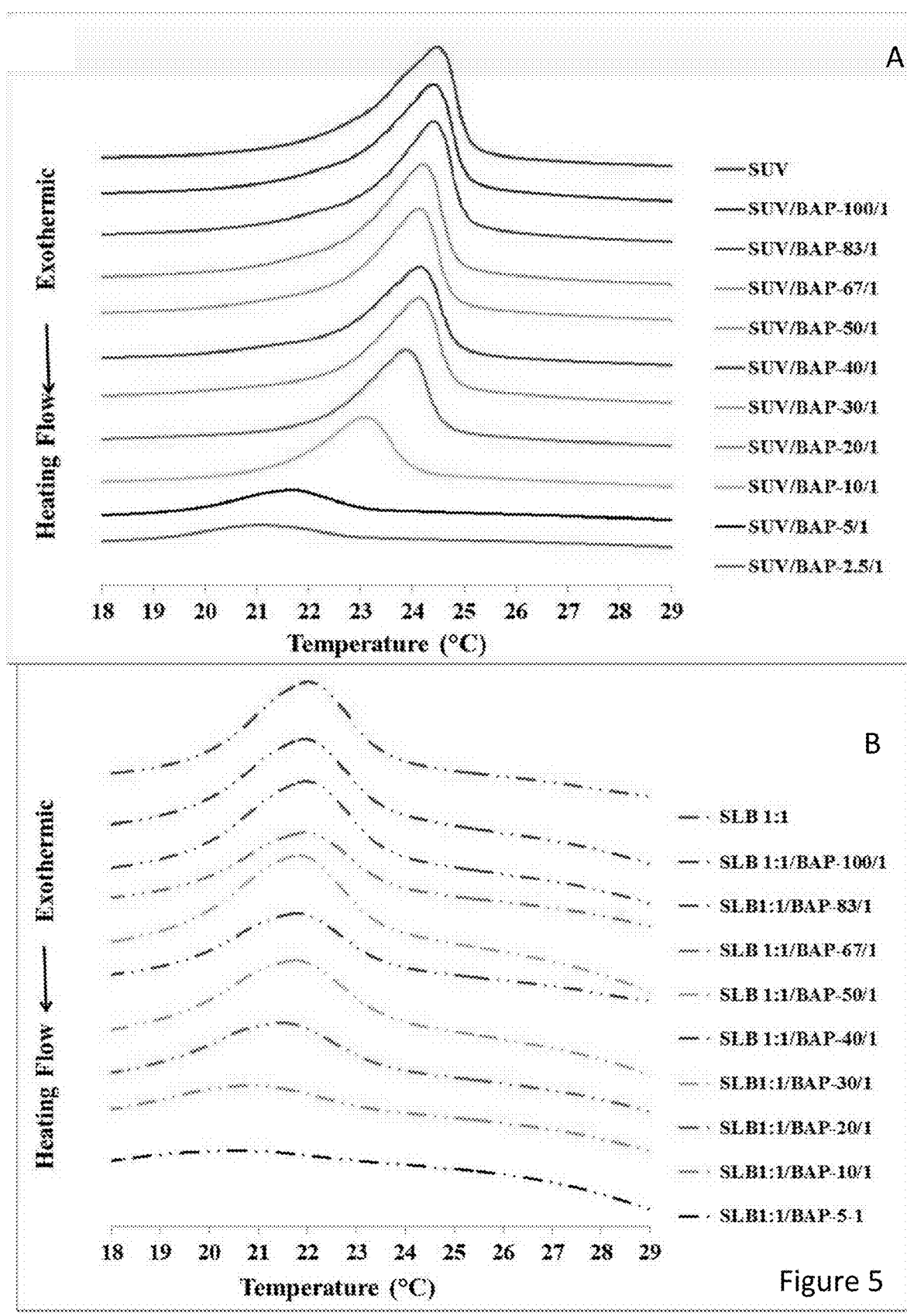
FIG. 5, comprised of FIGS. 5A-5B, depicts Nano-DSC traces of DMPC-SUVs and DMPC-NP-SLBs with SASUV/$SASiO_2=1/1$.

The nano-DSC traces for the DMPC-MLVs and DMPC-NP-SLBs with SASUV/SASiO$_2$=2/1 as a function of lipid/BaP molar ratio are shown in FIG. 4, and those for the DMPC-SUVs and DMPC-NP-SLBs with SASUV/SA-SiO$_2$=1/1 are shown in FIG. 5. As the amount of BaP is increased in any of the nanosystems, there is a downward shift in the main gel-to-liquid phase transition temperature, Tm, indicating increasing disorder in the alkyl chains of the lipids. The DMPC-MLVs, which are large, micrometer-sized multiple bilayers with a large water pocket at their interior, typically have narrower Tms than the small unilamellar vesicles (SUVs). Therefore, the shift and broadening of Tm with increased incorporation of BaP is more pronounced for the DMPC-MLVs than for the DMPC-SUVs. The phase transition can be observed at all loadings of lipid/BaP until 2.5/1, when Tm becomes very broad. However, at lipid/BaP ≤2.5/1, DMPC-SUVs exuded BaP, which was observed in the filter paper after extrusion. In other words, not all of the BaP was incorporated into the bilayer.

In the case of the DMPC-NP-SLBs, the phase transitions are broader, and the shifts are not as apparent until a lipid/BaP ratio of 40/1. However, the shifts for the DMPC-NP-SLB SASUV/SASiO$_2$=2/1 sample are the same as the combination of the DMPC-SUVs and DMPC-NP-SLB SASUV/SASiO$_2$=1/1 sample (FIG. 5). Although not wishing to be bound by any particular theory, these results suggest that the BaP partitions equally between the DMPC-NP-SLBs and the attached DMPC-SUVs.

Examination of Stability and Morphology of SUVs and NP-SLBs

To assess whether the nanosystem morphology remains the same when BaP is incorporated, DLS data were obtained for the DMPC-SUVs and DMPC-NP-SLBs (SASUV/SASiO$_2$=2/1) as a function of molar ratio of lipid/BaP. The sizes of the DMPC-SUVs and DMPC-NP-SLBs after incorporation of BaP remained the same within the detection limits of the DLS data. However, the sizes and polydispersity indices (PDI) were larger for the DMPC-NP-SLBs (SASUV/SASiO$_2$=2/1) (Dz=<155.8>±10 nm; PDI=0.083) compared to the DMPC-SUVs (Dz=<108.7>±10 nm; PDI=0.058). Although not wishing to be bound by any particular theory, these results suggest that either DMPC-SUVs are adsorbed to the NP-SLBs, or that there are some DMPC-NP-SLB "twins" present (Drazenovic et al., 2014, Biochim. Biophys. Acta Biomembr. 1848:532-543; Wang et al., 2012, RSC Adv. 30:11336-11348). At pH ~7, the zeta potential (ζ) of the SiO$_2$ is ζ~−44 mV; for the SUVs (with and without BaP) ζ=−1.8 mV; for DMPC-NP-SLBs (SASUV/SASiO$_2$=1/1) ζ~−22 mV; and for the DMPC-NP-SLBs (with and without BaP) ζ=−4.1 mV. Although not wishing to be bound by any particular theory, these results suggest that the lipid bilayer on the SiO$_2$ shields its negative charge, and that there is additional shielding from the adsorbed SUVs.

In order to determine if the DMPC-SUVs or DMPC-NP-SLBs were able to sorb BaP from the aqueous phase in the presence of other environmental adsorbants of BaP such as HA, it was first necessary to determine the effect of HA on the DMPC-SUVs and DMPC-NP-SLBs themselves. In particular, whether the DMPC-SUVs and DMPC-NP-SLBs maintained their morphology (i.e., whether they remained as DMPC-SUVs or DMPC-NP-SLBs) was examined and, if so, did their size or zeta potential change in the presence of HA. In order to rule out the possibility that these structures were destroyed and the lipids formed bilayers instead on the HA, leaving bare SiO$_2$ in the case of the DMPC-NP-SLBs, HA was added to the DMPC-NP-SLBs and DMPC-SUVs at concentrations between 0.025 and 0.5 mg/mL, with the lipid concentration kept constant at 1 mg/mL.

Figure 6:
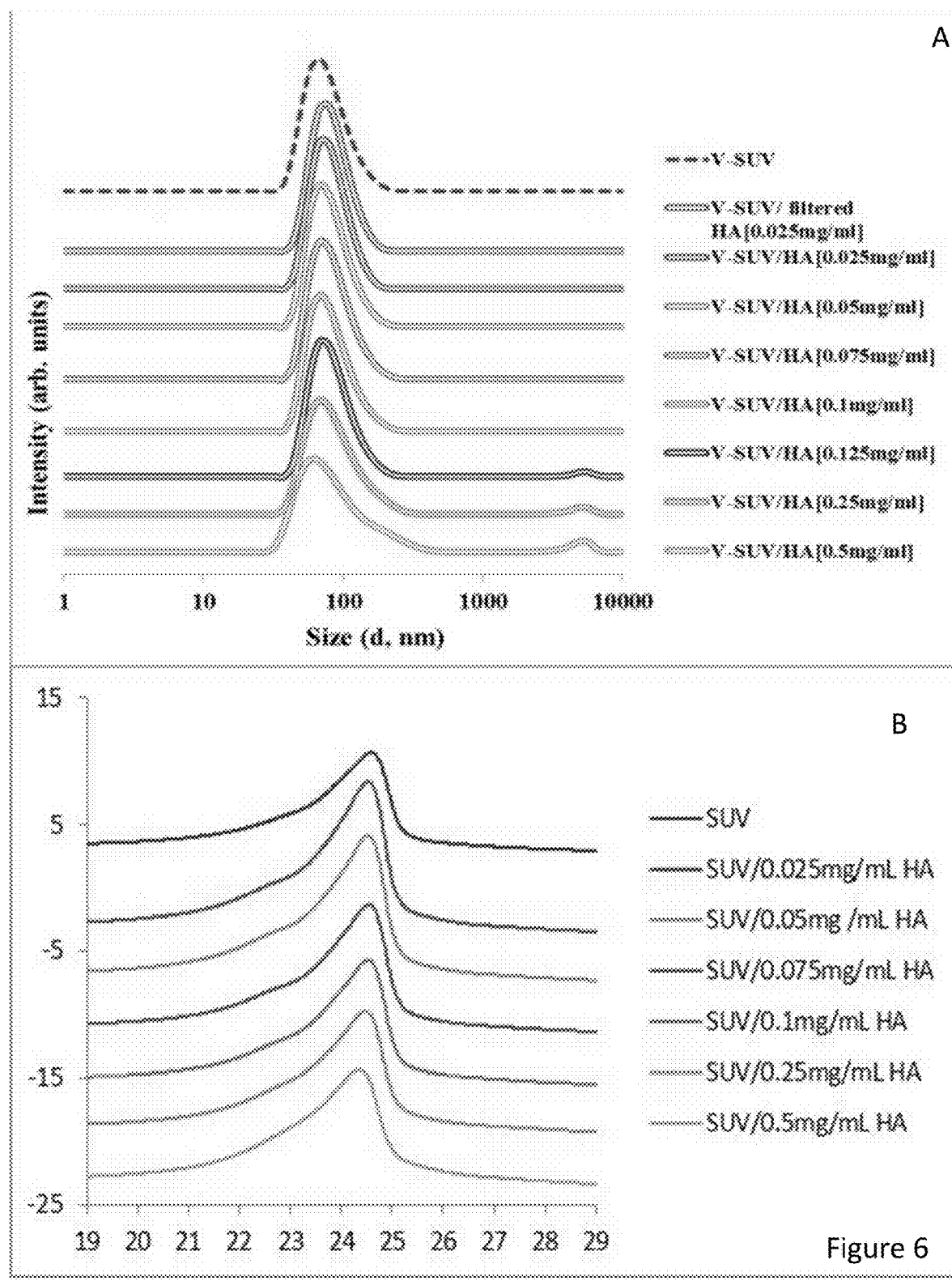
FIG. 6, comprised of FIGS. 6A-6B, depicts experimental data demonstrating DMPC-SUVs as a function of HA concentration.
Figure 7:
FIG. 7 is a photograph of DMPC-NP-SUVs (SASUV/$SASiO_2=1/1$) when [DMPC]=1 mg/mL, 10 mM NaCl, and pH=7. The vial on the right contains DMPC-NP-SUVs by themselves. The DMPC-NP-SUVs are stable for about 20 min at room temperature. The vial on the left contains DMPC-NP-SUVs with [HA]=0.5 mg/mL. The DMPC-NP-SUVs are stable for about 14 h at room temperature.

DLS data (FIG. 6) show no effect of HA on DMPC-SUVs except at the higher HA concentrations (due to HA aggregates ~900 nm, DLS data for HA alone). However, it was not possible to distinguish between HA adsorbed to the SUVs and HA in suspension. Zeta potential measurements (Table 1) indicate that ζ of the neat HA suspensions increases (becomes more negative) with an increase in HA concentration, and that addition of HA to DMPC-SUVs decreases the ζ of the suspensions and becomes more negative as the HA concentration increases. This result has also been observed for Al$_2$O$_3$ and ZnO in the presence of HA (Ghosh et al., 2008, Langmuir 24:12385-12391; Bian et al., 2011, Langmuir 27:6059-6068). The measurements also were unable distinguish between HA adsorbed to the SUVs, or an average of the nearly neutral DMPC (ζ~−2 mV) and free HA in suspension, or some combination of the two. However, HA adsorption does increase the colloidal stability of DMPC-NP-SLBs (SASUV/SASiO2=1/1) by at least 10-20 fold in 10 mM NaCl (FIG. 7).

Confirmation that the presence of HA, either adsorbed to the SUVs or free in suspension, does not affect the morphology of the SUVs comes from nano-DSC measurements (FIG. 6), where Tm of the SUVs is the same in the presence and absence of HA in the concentration range between 0.025 and 0.5 mg/mL. Although not wishing to be bound by any particular theory, these results suggests that the HA does not interact strongly with the SUVs, possibly through penetration of the alkyl chains of the bilayer (which would decrease Tm), and that only a weak association of the HA with the polar headgroups exists, as suggested by the zeta potential measurements.

Effect of HA on the BaP Extraction by Vesicles and NP-SLBs

The results described above demonstrate that it is possible to form DMPC-SUVs and DMPC-NP-SLBs that incorporate BaP in high amounts, and that HA does not destroy the DMPC-SUV morphology. It was also investigated whether DMPC-SUVs and DMPC-NP-SLBs can sorb BaP from aqueous media. In other words, whether the water-insoluble BaP still has sufficient solubility to enable migration to the DMPC-SUVs and DMPC-NP-SLBs, where they act as "sinks" for the BaP. Further, it was examined whether this occurs in the presence of HA (whether the BaP is preferentially sorbed by the lipids in the DMPC-SUVs or DMPC-NP-SLBs) or remains with the HA.

Figure 8:
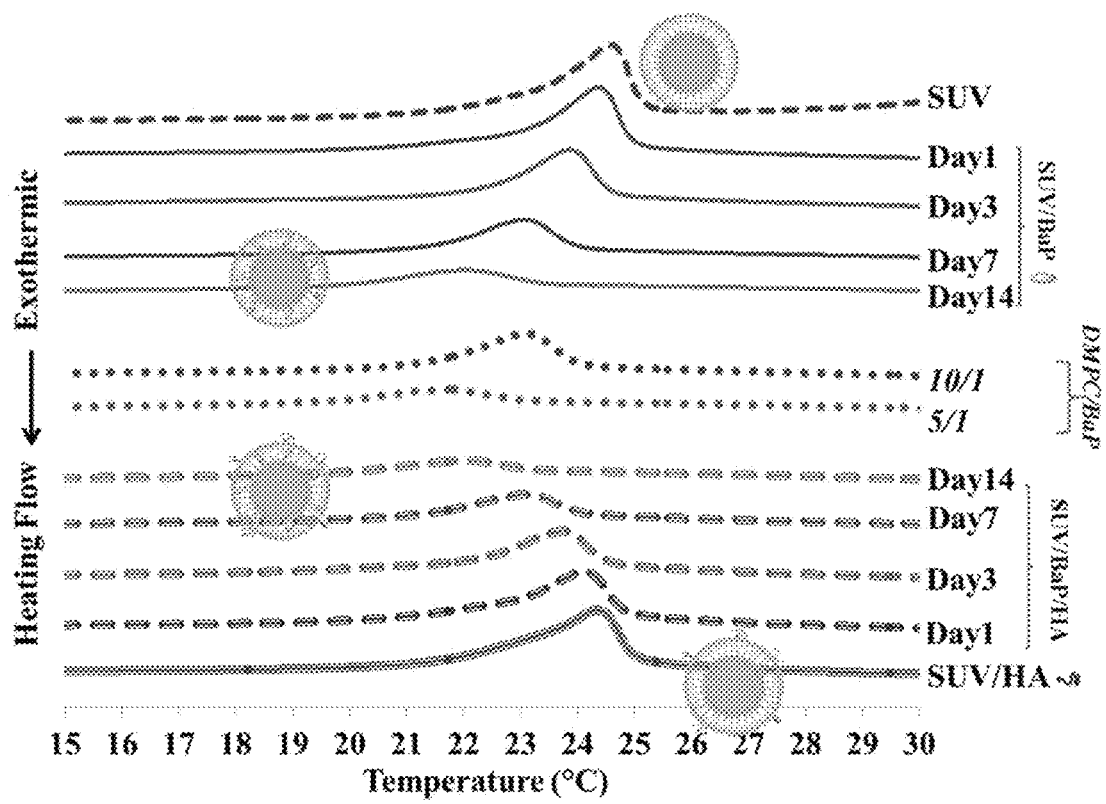
FIG. 8, comprised of FIGS. 8A-8B, depicts time-dependent nano-DSC traces of DMPC-SUVs and DMPC-NP-SLBs at 33° C. with and without HA, in the presence of water insoluble BaP.
Figure 8:
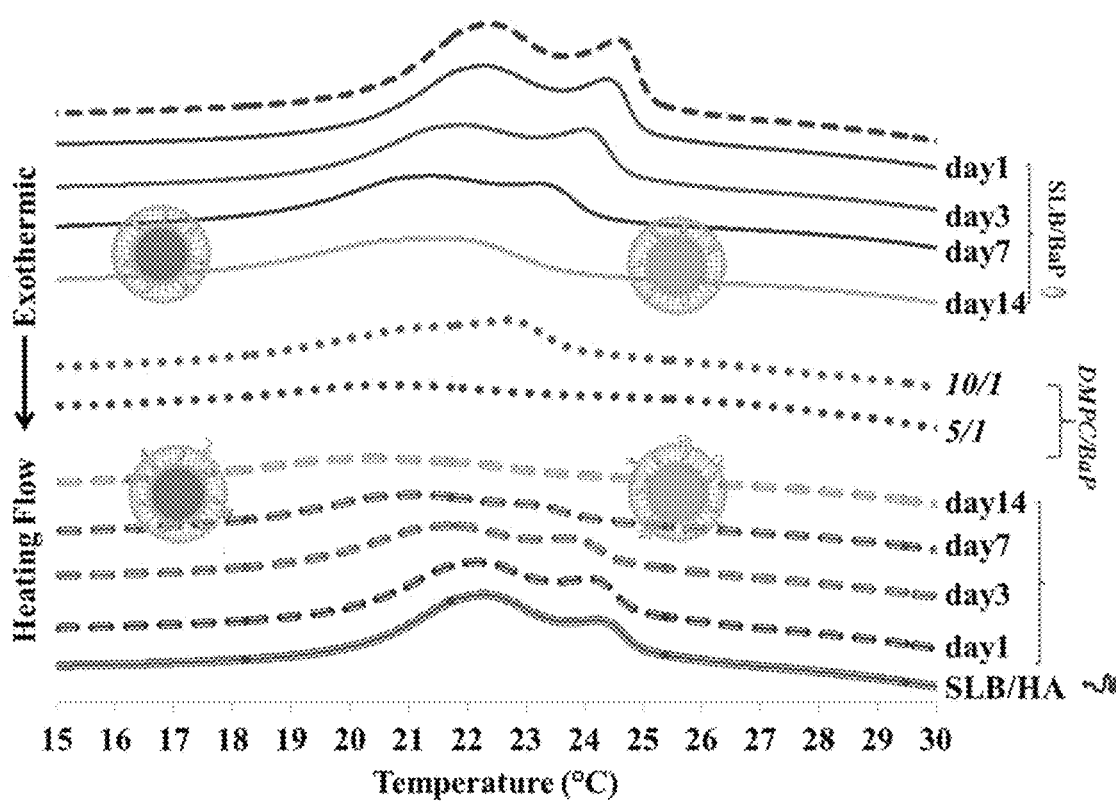
Figure 9:
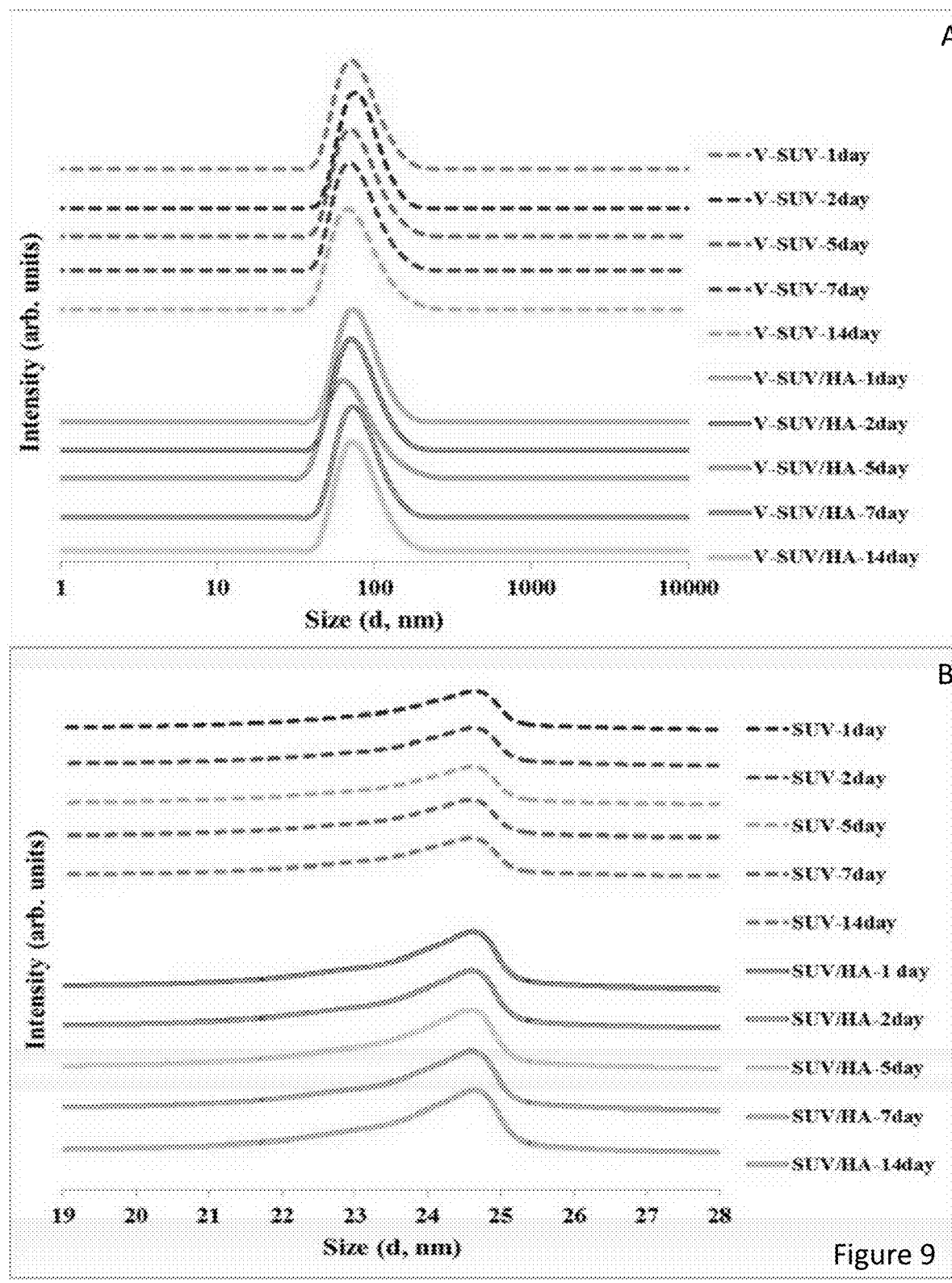
FIG. 9, comprised of FIGS. 9A-9B, depicts experimental data of time dependent sizes (by DLS) of DMPC-SUVs and DMPC-SUVs with HA.

Time-dependent nano-DSC traces of DMPC-SUVs (1 mg/mL) with and without [HA]=0.5 mg/mL incubated with solid BaP at 33° C. are shown in FIG. 8A and schematically in the TOC graphic. Similar results were obtained when [HA]=0.075 mg/mL. Enough BaP was added such that if all the BaP was uptaken by the DMPC-SUVs, the molar ratio in the SUVs would be <2.5 lipid/1 BaP. The observed shifts in Tm demonstrate that BaP is increasingly incorporated into the DMPC-SUVs, and that the presence of HA does not affect this BaP uptake. After 2 weeks, the amount of BaP sorbed by the SUVs with or without HA is at a lipid/BaP ratio of ~10/1 to 5/1, and the DMPC-SUVs remained intact (no change in their size was detected), providing sufficient time for microbial degradation in most environmental settings. Controls (without BaP) showed no change in size or Tm (FIG. 9) over the same time period. These results demonstrate that shifts occurred as a result of BaP sorption, and not from changes in the SUVs or NP-SLBs themselves. Similar results (FIG. 8B) were obtained for the DMPC-NP-SLBs (SASUV/SASiO$_2$=2/1); after 2 weeks the amount of BaP sorbed, whether in the absence or presence of HA, was at a lipid/BaP ratio of ~10/1 to 5/1. Although not wishing to be bound by any particular theory, this suggests that the total amount of lipid available in the system determines the amount of BaP uptake, and not the form of lipid (whether DMPC-SUVs or DMCP-NP-SLBs). These results also suggest that further BaP incorporation is possible. Although aromatic organic contaminants may interact with soil organic matter (Zhu et al., 2004, Environ. Sci. Technol. 38:4361-4368) and humic substances (Wijnia et al., 2004, J. Environ. Qual. 33:2665-275) through π-π interactions, these are presumably weaker than the hydrophobic association between BaP and the lipid core of the nanoparticles examined herein.

Figure 10:
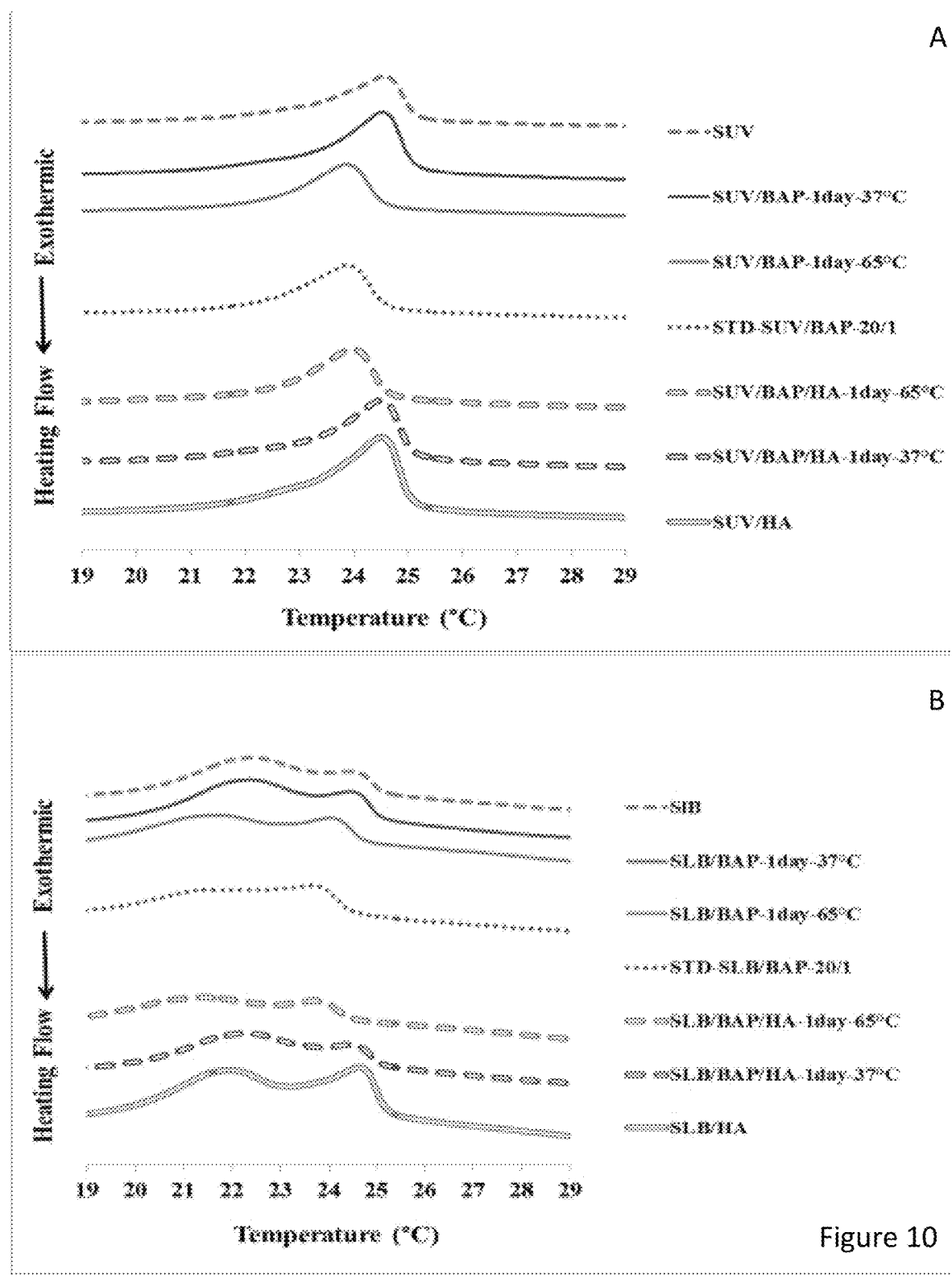
FIG. 10, comprised of FIGS. 10A-10B, depicts time dependent nano-DSC traces after 1 day at 37° C. and 65° C. of DMPC SUVs and DMPC-NP-SLBs with and without HA, in the presence of water insoluble BaP.

The temperature at which the DMPC-SUVs and DMPC-NP-SLBs (SASUV/SASiO$_2$=2/1) were incubated with the excess BaP, with and without HA, to 65° C. In this case, the BaP became incorporated into the lipid bilayers at a faster rate (FIG. 10). Although both DMPC-SUVs and DMPC-NP-SLBs incorporate BaP, the latter may be more desirable for remediation, since DMPC-SUVs may adsorb prematurely to mineral or clay surfaces in soil, as has been observed for nonionic alkyl ethoxylate surfactants (Grasso et al., 2001, Colloids Surf. A 194:65-74), preventing migration of the SUVs to the contaminated site. DMPC-NP-SLBs (SASUV/SASiO$_2$=2/1) and DMPC-NP-SLBs (SASUV/SA-SiO2=1/1) with HA are stable colloids, and lipid exchange/removal from NP surfaces is a much slower process than vesicle fusion (Naumann et al., 1992, Biophys. J. 63:1314-1319).

Bacterial Growth Studies

To determine whether *P. aeruginosa* (a common microorganism found in soil) was able to biodegrade these nanosystems, DMPC-SUVs and DMPC-NP-SLBs, with and without BaP, were provided as the sole carbon source in growth media, and growth was monitored by optical density (OD) measurements. TEM analysis of bacteria samples cultured with DMPC-NP-SLB with BaP (FIG. 11) was used to examine the physical interactions between the DMPC-NP-SLBs and bacteria, and to enable visualization of cell membrane disruption.

Figure 11:
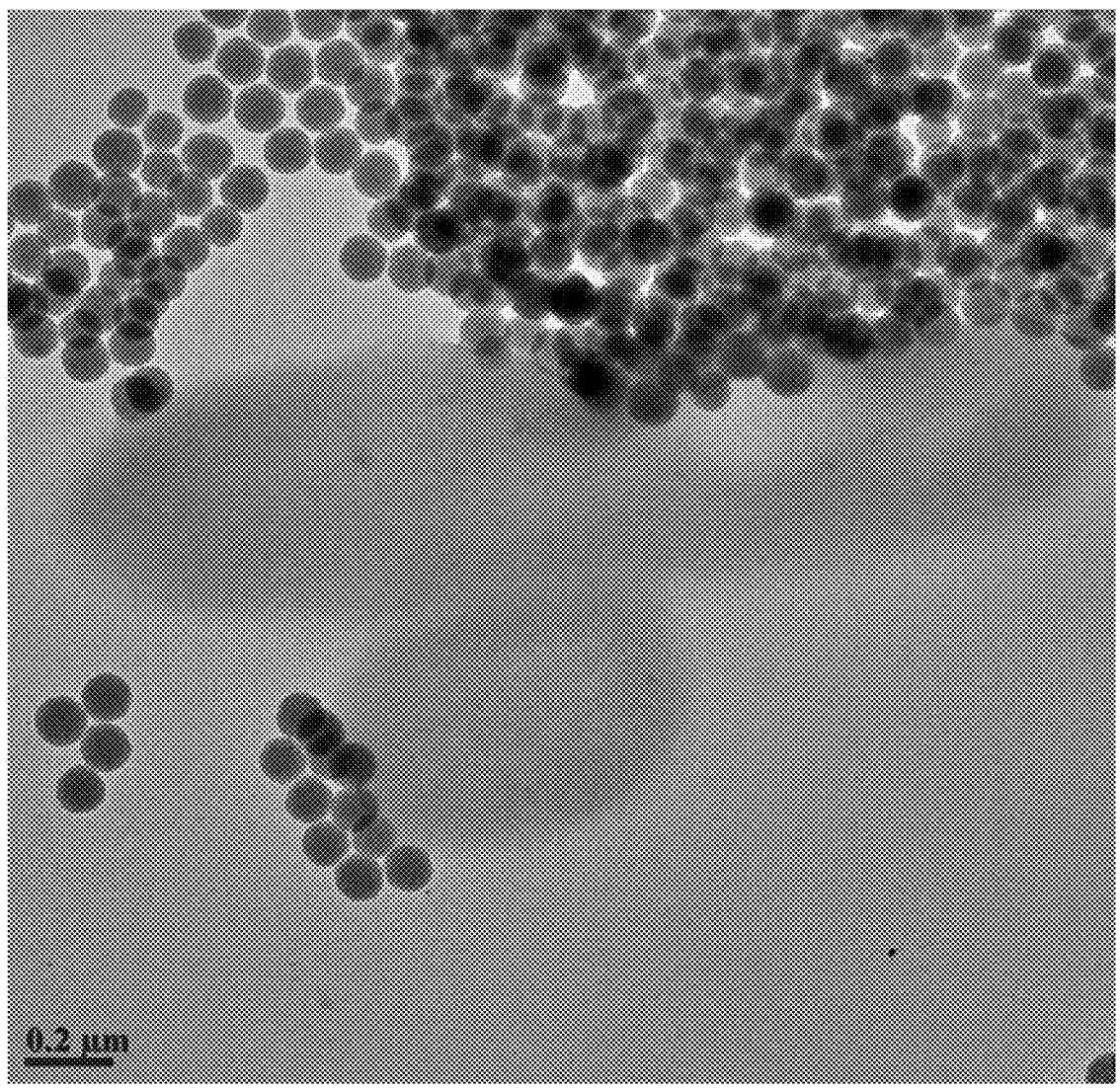
FIG. 11 is a transmission electron microscopy (TEM) image of P. aeruginosa bacterial cells and DMPC-NP-SLBs ($SA_{SUV}/SA_{SiO2}=2/1$) with BaP (lipid/BaP=20/1).

The results of the bacteria growth experiments presented in Table 2 demonstrate that *P. aeruginosa* readily grow even when lipids (in the form of DMPC-SUVs and DMPC-NP-SLBs) were the sole carbon source provided. Control experiments showed no bacterial growth when media (M-PAM) with no carbon source was used (1RR), and the same growth with and without added SiO$_2$ using PAM (acetic acid as carbon source), indicating that SiO$_2$ did not kill the bacteria. Within the uncertainties of the experiments, cell growth occurs at comparable levels whether the same amount of lipid is provided in the form of SUVs (1S), or is attached to SiO$_2$ as a supported lipid bilayer (2S). Second, even with addition of BaP (3S and 4S), bacterial growth did not seem to slow, presenting OD$_{600}$ values similar to those of the DMPC-SUVs or DMPC-NP-SLBs (1S and 2S) at least at the concentrations (lipid/BaP=20/1) used herein. In the case of the DMPC-NP-SLBs (with or without BaP), there was some precipitation of the cells in the culture media. OD$_{600}$ measurements were taken while leaving the precipitate at the bottom of the test tube, and after shaking the test tubes so that these aggregates became resuspended. This result explains the discrepancy between the OD$_{600}$ measurements; at the same total lipid, the former produced lower OD$_{600}$ values than the latter. Although not wishing to be bound by any particular theory, it is hypothesized that the precipitation is due to the fact that in M-PAM9, the DMPC-NP-SLBs have a small positive zeta potential, while *P. aeruginosa* has a negative zeta potential, resulting in some agglomeration, as observed in the TEM images (FIG. 11). The TEM images also indicated that cell membranes remained intact in the presence of SiO$_2$ NPs and that no SiO$_2$ NP internalization occurred.

TABLE 2

Bacterial Growth Studies Using *Pseudomonas aeruginosa* Strain PA01 HS

| Name | Sample composition | | | OD$_{600}$ |
|---|---|---|---|---|
| 1S | 1.45 mL SUVs | 3.55 mL M-PAM9 | 0.65 mL *P. aeruginosa*$^a$ | 0.65 |
| 1R | 1.45 mL SUVs | 4.20 mL M-PAM9 | — | 0 |
| 1RR | 0 | 5.65 mL M-PAM9 | 0.65 mL *P. aeruginosa* | 0$^c$ |
| 2S | 1.45 mL NP-SLBs | 3.55 mL M-PAM9 | 0.65 mL *P. aeruginosa* | 0.12/1.2$^b$ |
| 2R | 1.45 mL NP-SLBs | 4.20 mL M-PAM9 | — | 0 |
| 3S | 1.45 mL SUVs/BAP | 3.55 mL M-PAM9 | 0.65 mL *P. aeruginosa* | 0.64 |
| 3R | 1.45 mL SUVs/BAP | 4.20 mL M-PAM9 | — | 0 |
| 4S | 1.45 mL NP-SLBs/BAP | 3.55 mL M-PAM9 | 1.65 mL *P. aeruginosa* | 0.56/1.5$^b$ |
| 4R | 1.45 mL NP-SLBs/BAP | 4.20 mL M-PAM9 | — | 0 |

$^a$The amount of culture media taken after 24 h.
$^b$For the NP-SLBs and NP-SLBs/BaP samples, there was some precipitate. For these samples, the first number was obtained from the supernatant and the second was from after the sample was shaken, so that the precipitate was included.
$^c$The small amount of added cells of *P. aeruginosa* precipitated/died.

These results described herein demonstrate that *P. aeruginosa* can use lipids in the forms of vesicles and supported bilayers, and both with incorporated BaP, as the sole carbon sources. These results also demonstrate the potential for bioremediation by a common soil/water bacterium to remove BaP (or other persistent, strongly sorbed organic contaminants) from the environment when lipid extraction of these materials occurs through hydrophobic interactions.

The disclosures of each and every patent, patent application, and publication cited herein are hereby incorporated herein by reference in their entirety. While this invention has been disclosed with reference to specific embodiments, it is apparent that other embodiments and variations of this invention may be devised by others skilled in the art without departing from the true spirit and scope of the invention. The appended claims are intended to be construed to include all such embodiments and equivalent variations.

The invention claimed is:

1. A method of in situ environmental remediation comprising:
    contacting contaminated soil or water with a remediation composition, said remediation composition comprising a silica nanoparticle supported phospholipid bilayer (NP-SLB) composition,
    wherein the NP-SLB composition is a silica nanoparticle having a single phospholipid bilayer attached thereto;
    wherein the NP-SLB composition absorbs one or more hydrophobic organic contaminants from said contaminated soil or water; and
    degrading or decomposing the one or more hydrophobic contaminants adsorbed to the NP-SLB composition with a microorganism while maintaining the NP-SLB composition in contact with the soil or water.

2. The method of claim 1, wherein the NP-SLB composition further comprises a mixture of single lipid bilayer nanoparticles and multiple lipid bilayer nanoparticles.

3. The method of claim 1, wherein the remediation composition further comprises small unilamellar vesicles (SUVs).

4. The method of claim 3, wherein at least a portion of the SUVs are attached to an NP-SLB.

5. The method of claim 1, wherein the remediation composition further comprises large unilamellar vesicles (LUVs).

6. The method of claim 5, wherein at least a portion of the LUVs are attached to an NP-SLB.

7. The method of claim 1, wherein the remediation composition further comprises multilamellar vesicles (MLVs).

8. The method of claim 7, wherein at least a portion of the MLVs are attached to an NP-SLB.

9. The method of claim 1, wherein the lipid bilayer comprises 1,2-dimyristoyl-sn-glycero-3-phosphocholine (DMPC).

10. The method of claim 1, wherein the lipid bilayer comprises 1,2-dioleoyl-sn-glycero-3-phosphocholine (DOPC).

11. The method of claim 1, wherein the one or more hydrophobic organic contaminants is a polycyclic aromatic hydrocarbon (PAH).

* * * * *